United States Patent
Hays et al.

(10) Patent No.: US 11,167,477 B1
(45) Date of Patent: Nov. 9, 2021

(54) FABRICATION OF 3D OBJECTS VIA DIRECT POWDER DEPOSITION

(71) Applicant: Xactiv, Inc., Fairport, NY (US)

(72) Inventors: Dan A. Hays, Venice, FL (US); Peter J. Mason, Webster, NY (US)

(73) Assignee: Xactiv, Inc., Fairport, NY (US)

( * ) Notice: Subject to any disclaimer, the term of this patent is extended or adjusted under 35 U.S.C. 154(b) by 743 days.

(21) Appl. No.: 15/849,668

(22) Filed: Dec. 21, 2017

Related U.S. Application Data

(60) Provisional application No. 62/443,007, filed on Jan. 6, 2017.

(51) Int. Cl.

| | |
|---|---|
| *B29C 64/165* | (2017.01) |
| *B22F 3/15* | (2006.01) |
| *B29C 64/209* | (2017.01) |
| *G03G 15/02* | (2006.01) |
| *B29C 64/176* | (2017.01) |
| *B33Y 30/00* | (2015.01) |
| *B22F 3/00* | (2021.01) |
| *B29C 64/245* | (2017.01) |
| *B05D 1/04* | (2006.01) |

(52) U.S. Cl.
CPC ............ *B29C 64/165* (2017.08); *B22F 3/003* (2013.01); *B22F 3/156* (2013.01); *B29C 64/176* (2017.08); *B29C 64/209* (2017.08); *B29C 64/245* (2017.08); *B33Y 30/00* (2014.12); *G03G 15/0241* (2013.01); *B05D 1/045* (2013.01)

(58) Field of Classification Search
CPC .... B29C 64/165; B29C 64/245; B29C 64/176
See application file for complete search history.

(56) References Cited

U.S. PATENT DOCUMENTS

| | | | |
|---|---|---|---|
| 4,755,837 A * | 7/1988 | Schmidlin | B41J 2/4155 347/55 |
| 6,066,285 A * | 5/2000 | Kumar | G03G 15/224 264/439 |
| 6,206,672 B1 | 3/2001 | Grenda | |
| 6,398,345 B1 * | 6/2002 | Sakai | B41J 11/007 347/55 |
| 9,144,940 B2 | 9/2015 | Martin | |
| 10,272,618 B2 | 4/2019 | Hays et al. | |
| 2013/0075022 A1 | 3/2013 | Chillscyzn et al. | |
| 2013/0077996 A1 | 3/2013 | Hanson et al. | |
| 2013/0186549 A1 | 7/2013 | Comb et al. | |
| 2013/0186558 A1 | 7/2013 | Comb et al. | |
| 2015/0024317 A1 | 1/2015 | Orrock et al. | |
| 2016/0200084 A1 | 7/2016 | Hays et al. | |

(Continued)

*Primary Examiner* — Joseph A Miller, Jr.
(74) *Attorney, Agent, or Firm* — John M. Hammond; Patent Innovations LLC

(57) ABSTRACT

A method of fabricating an object, comprising direct depositing a first layer of first object material on a support substrate electrode; applying a conductive agent material onto the first layer; direct depositing a first layer of charged powder onto the first layer on the support substrate electrode, to form a first powder layer on the first layer on the support substrate electrode. Multiple powder layers may be direct deposited on the first layer. The method may be further comprised of fusing the powder layer(s) to form a first fused layer on the support substrate electrode. A related object fabrication apparatus is also disclosed.

14 Claims, 14 Drawing Sheets

(56) References Cited

U.S. PATENT DOCUMENTS

| | | |
|---|---|---|
| 2016/0243764 A1 | 8/2016 | Hays et al. |
| 2016/0339646 A1 | 11/2016 | Baecker et al. |
| 2017/0151719 A1 | 6/2017 | Swartz et al. |
| 2017/0192377 A1 | 7/2017 | Batchelder et al. |
| 2017/0291362 A1 | 10/2017 | Tombs et al. |
| 2017/0299973 A1 | 10/2017 | Frauens |
| 2017/0326797 A1 | 11/2017 | Alvarez et al. |
| 2017/0326805 A1 | 11/2017 | Alvarez et al. |
| 2018/0029300 A1 | 2/2018 | Batchelder |
| 2018/0126666 A9 | 5/2018 | Swartz et al. |

\* cited by examiner

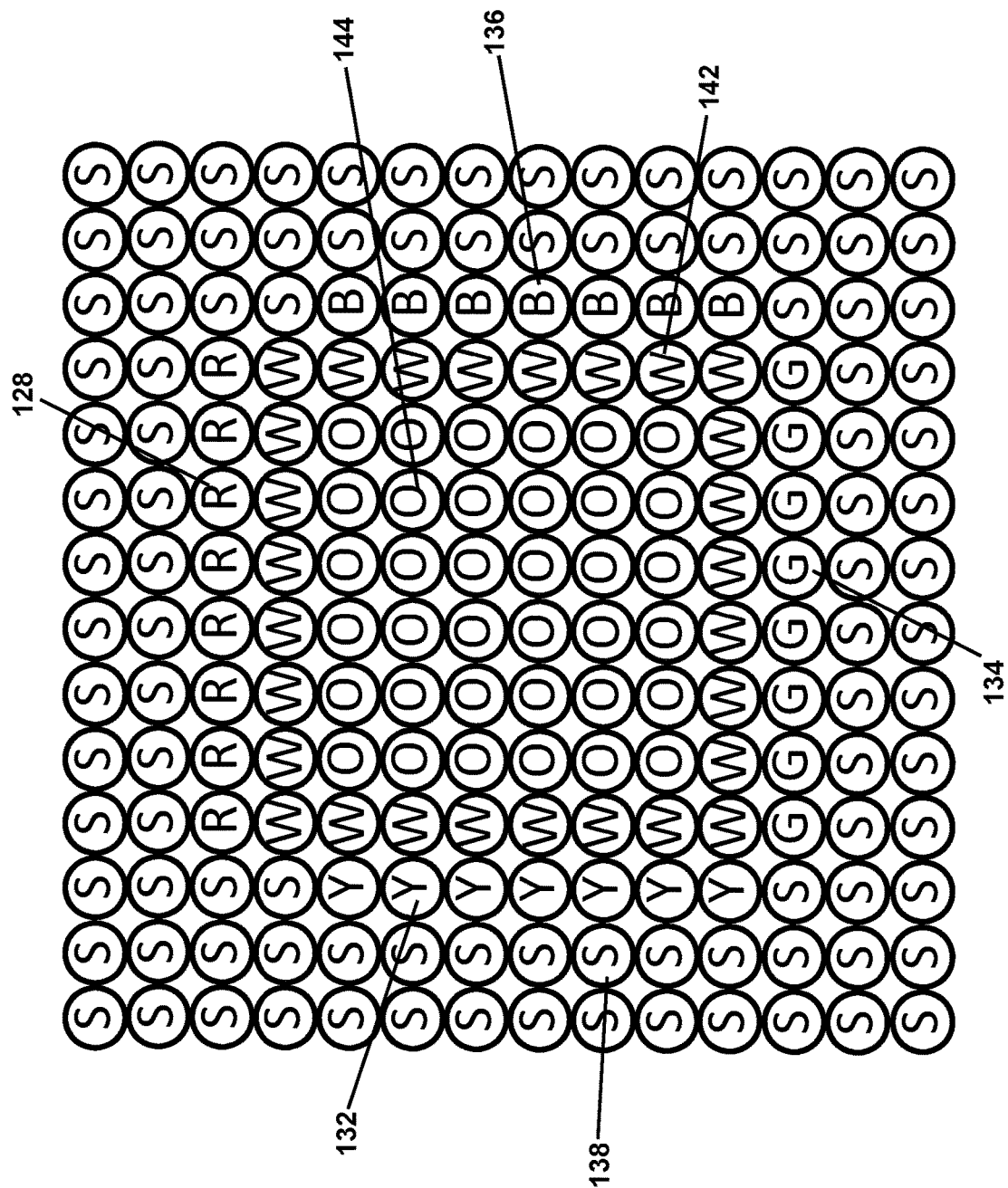

FABRICATION OF 3D OBJECTS VIA DIRECT POWDER DEPOSITION

CROSS-REFERENCE TO RELATED PATENT APPLICATIONS

This application claims the benefit of U.S. Provisional Patent Application No. 62/443,007 filed Jan. 6, 2017, the disclosure of which is incorporated herein by reference. This application is also related to commonly owned copending U.S. patent application Ser. No. 15/050,729 filed on Feb. 23, 2016, and U.S. Provisional Patent Application No. 62/440,487 filed on Dec. 30, 2016, the disclosures of which are incorporated herein by reference.

BACKGROUND

Technical Field

Devices for and methods of fabrication of three-dimensional objects from powder starting materials.

Description of Related Art

This disclosure relates to a process and apparatus for more efficiently manufacturing three-dimensional (3D) objects from powder materials using a digital multilayer fabrication method. The 3D manufacturing process, also known as additive manufacturing, rapid prototyping or solid freeform, uses digital files that describe cross sections for building the desired part(s) and support structure(s). Various 3D manufacturing methods have been proposed for digitally fabricating a uniquely shaped object on a build platform. The build rate of digitally produced 3D objects as currently practiced is inherently slow since 1) each 2D layer is typically formed by a two-dimensional scanning device and 2) many 2D layers (up to thousands in a high resolution part) are required to produce an object. Furthermore, some manufacturing methods require additional time to post-process a layer before deposition of the next layer. Regardless of the method for building the 3D object, there is a general need to implement process improvements for reducing the time to build uniquely shaped 3D objects.

Various additive manufacturing systems have been proposed and implemented for producing three-dimensional objects by either selectively depositing, binding or polymerizing raw materials together in multiple layers. The various alternative methods include filament extrusion techniques, ink jetting, aerosol jetting, powder fed directed energy (laser) deposition, selective laser sintering, binder jetting, electron beam melting, and stereolithographic processes. In general, the various methods tend to exhibit a slow build rate. For example, many of the selective deposition methods have a slow build rate since the deposition of the build and support materials is generally provided by a scanning head for extruding or jetting the material for each layer.

For the purpose of increasing the build rate, 3D manufacturing methods based on electrophotography have been proposed. Although it is recognized that the electrophotographic process can enable rapid formation of 2D layers, researchers have reported problems when attempting to produce arbitrarily thick 3D objects when using conventional electrophotography to produce charged powder depositions that are repeatedly electrostatically transferred and heat fused to the object being built. In one instance, it was found that after about 20 transfers, the object surface had many defects and irregularities that compromised the quality of the object.

In addition to the surface defects problem that arises after many electrostatic transfers of charged powder to build an object by using an electrophotographic process, the thickness of the object is self-limited for the conventional electrostatic transfer process. When the electrostatic force for transferring charged powder is provided by an electric field due to an electrical bias applied between the conducting support substrate of the build object and either the ground plane of the photoconductor or an intermediate belt, the electric field and correspondingly the applied electrostatic force decreases with increasing thickness of the object. Furthermore, the accumulation of charge on the object due to the charge on the transferred powder creates an electric field that suppresses powder transfer and therefore limits the thickness of the build object and causes irregularities in the surface.

In summary, in currently practiced methods for digitally fabricating 3D objects with the sequential deposition of multiple layers, the rate for producing 3D objects with such methods is undesirably slow. Accordingly, there remains a need for a high build rate method and apparatus, which can build a three-dimensional part that is free of defects.

SUMMARY

It is the purpose of this disclosure to describe a new process, apparatus, and materials for the additive manufacturing of a 3D object and support material via the direct deposition of multiple layers of triboelectric charged, non-conductive powder onto a 3D object and support structure that is repeatedly rendered sufficiently conducting either temporarily or permanently. In a preferred embodiment, an aperture array spaced between the powder source and 3D object and support structure controls the spatial distribution of powder deposited on the 3D object and support structure via electrostatic forces. For direct powder deposition methods that utilize an electric field within the gap between the aperture array and 3D structure to provide an electrostatic deposition force acting on the charged powder, the conductive rendering of the 3D object and support material surfaces serves to both neutralize deposited charged powder and provide an electrode for maintaining an electric field within the gap that is independent of the 3D object thickness.

The process for rendering the 3D object and support material sufficiently conducting for electrostatic deposition and/or neutralization of the powder on the 3D object is a separate post-deposition step. The post-deposition step may also include methods for providing heat and/or pressure for consolidating or fusing the powder layer to the 3D object and support material, as well as a conditioning step for maintaining a smooth and uniformly thick 3D object and support material. The separation of the powder deposition step from the powder and 3D object heating step enables higher build rates since the requirements for heating and cooling of the materials during a post deposition step are different. It should be noted that a 3D object manufacturing method and apparatus based on direct deposition of triboelectric charged, non-conductive powder onto a 3D object and support material is particularly advantageous due to an air gap between the powder deposition apparatus that is desired to be maintained near the ambient temperature and the 3D object and support material that has been heated to a powder sintering or fusing temperature. The air gap provides good thermal isolation between the deposition apparatus and 3D object.

For direct powder deposition methods that utilize an electric field within the gap between the aperture array and 3D structure, the electrostatic deposition of triboelectric charged, non-conductive powder onto the 3D object and support is enabled by repeatedly rendering the 3D object and support material sufficiently conductive so that an electrical bias can be provided between the aperture array and the surface of the 3D object and support material. Thus, the electric field within the gap due to the applied electrical bias is independent of the thickness of the 3D object and support material. The polarity of the electrical bias applied to the 3D object and support material rendered conducting is of opposite polarity to that of the charged powder.

Since non-conductive powder is used to build the 3D object and support material, the conversion of the 3D part/support to a conductive material can be either temporary or permanent. If it is desired that the 3D object be electrically non-conductive upon the completion of the 3D object fabrication, then a temporary or transient conductivity can be imparted to the 3D object during the build process. Examples of temporary conductive agents include various liquids such as alcohols or water with surfactants. On the other hand, if it is either desired or of no consequence that the 3D object is electrically conducting upon completion of the additive manufacturing, then permanent conductivity can be imparted to the 3D object during the layer deposition process. Examples of materials that can increase conductivity include fine conductive particles such as conductive polymers, carbon black, graphite, graphene, graphene nanoplatelets, carbon nanowires, or carbon nanotubes, fluorine-doped tin oxide and sublimable materials such as indium tin oxide, etc. Depending on the conductivity of the permanent conductive agent, the electrical properties of the 3D object can be tailored to span a range from charge-relaxable to conducting.

More particularly, in accordance with the present disclosure, there is provided a method for fabricating an object. The method is comprised of directly depositing a first layer of first object material on a support substrate electrode; applying a conductive agent material onto the first layer on the support substrate electrode; and directly depositing a first layer of charged powder onto the first layer of first object material on the support substrate electrode, to form a first powder layer on the first layer of first object material on the support substrate electrode.

The directly depositing a first powder layer on the first layer of first object material on the support substrate electrode may include the steps of forming a layer of charged powder upon a powder layer conveying surface; moving the powder layer conveying surface with the layer of charged powder in a conveyance direction proximate to a first aperture array comprising a panel having an inner surface and an outer surface, and a first plurality of powder dispensing apertures formed along an array axis perpendicular to the conveyance direction, each of the powder dispensing apertures comprised of a ring electrode surrounding an orifice extending through the panel from the inner surface to the outer surface; moving the support substrate electrode in the conveyance direction, either synchronously or asynchronously with motion of the powder layer conveying surface with the layer of charged powder in the conveyance direction; for each of the powder dispensing apertures, applying a voltage to the ring electrode to cause a portion of powder from the powder layer on the conveying surface to move from proximate to the inner surface through the orifice past the outer surface, and to be deposited as a powder dot upon the support substrate surface of the object build platform, wherein the powder dots are deposited on the support substrate electrode in a first powder dot pattern; and repeatedly moving the powder layer conveying surface with the layer of charged powder in the conveyance direction proximate to the first aperture array while forming second and subsequent powder dot patterns, to form a first powder layer on the support substrate surface of the object build platform. In certain embodiments, the powder dot pattern may be directed along a dot axis parallel to the aperture array axis to form a first powder line. The method may further comprise repeatedly moving the powder layer conveying surface with the layer of charged powder in the conveyance direction proximate to the first aperture array to form second and subsequent powder dot lines.

The method may be further comprised of fusing the first powder layer on the support substrate electrode to form a first fused layer on the support substrate electrode. In certain embodiments, the first layer may be such as to enable removal from the support substrate electrode.

In certain embodiments, the first layer is comprised of a top surface and a side wall, and applying the conductive agent material onto the first layer on the support substrate electrode is comprised of applying the conductive agent material onto the top surface of the first layer, and onto at least a portion of the side wall of the first layer to cause the conductive agent material on the top surface of the first layer to be in electrical contact with the support substrate electrode.

The method may be further comprised of applying the conductive agent material onto the first fused layer on the support substrate electrode; directly depositing a second layer of charged powder onto the first fused layer on the support substrate electrode to form a second powder layer on the first fused layer on the support substrate electrode, and fusing the second powder layer on the first fused layer. Alternatively, the method may be further comprised of directly depositing a second layer of charged powder onto the first powder layer on the first layer on the support substrate electrode, and optionally, fusing the first and second powder layers to form a first fused layer on the support substrate electrode. In embodiments in which the object is comprised of N powder layers fused into a first fused layer, the method may further comprise repeating N−2 times the steps of directly depositing an additional layer of charged powder onto the preceding powder layer on the support substrate electrode; and fusing the additional layers of charged powder into the first fused layer.

In certain embodiments, the conductive agent may be a liquid. In some embodiments, the liquid may be a liquid polymer solution. In other embodiments, the liquid may be a polar protic solvent selected from the group consisting of water, alcohols having a molecular weight of less than 61, and mixtures thereof. The liquid conductive agent may further include a surfactant. The liquid conductive agent may be temporarily present on the first layer. In other embodiments, the conductive agent may be a solid material, such as graphene nanoplatelets.

In certain embodiments, the first layer of first object material may be formed by directly depositing a base layer of charged powder onto the support substrate electrode, and fusing the base layer on the support substrate electrode.

In certain embodiments, each of the powder dispensing apertures may be comprised of first and second dot deflection control electrodes. In such embodiments, a first powder dot pattern may be comprised of a first set of powder dots deflected in a first diagonal direction opposite the conveyance direction and in a first lateral direction along the aperture array axis, a second powder dot pattern comprised of a second set of powder dots undeflected by either of the first and second dot deflection control electrodes, and a third powder dot pattern comprised of a third set of powder dots deflected in a first diagonal direction in the conveyance direction and in a second lateral direction along the aperture array axis and opposed to the first lateral direction.

In accordance with the present disclosure, there is also provided an apparatus for fabricating an object. The apparatus is comprised of a charged powder layer conveying device including a charged powder conveying surface movable in a conveyance direction a first powder aperture array disposed proximate to the charged powder conveying surface of the charged powder layer conveying device and comprising a panel having an inner surface and an outer surface, and a first plurality of powder dispensing apertures; and an object build platform comprising a conductive support substrate electrode and coupled to a platform drive system operable to move the conductive support electrode in the conveyance direction relative to the powder aperture array. The apparatus may include a post-deposition station comprising a conductive material dispenser, the post-deposition station capable of relative motion with respect to the object build platform to enable the conductive material dispenser to dispense conductive material upon at least one of the conductive support substrate surface and a surface of a powder layer of the object disposed on the conductive support substrate surface. The apparatus may include a powder layer supply device operable to form a powder layer on the charged powder conveying surface of the charged powder layer conveying device.

In certain embodiments, the powder dispensing apertures of the first powder aperture array may be arrayed along a first axis perpendicular to the conveyance direction of the charged powder conveying surface. In such embodiments, each of the powder dispensing apertures may be comprised of an orifice extending through the panel from the inner surface to the outer surface, a ring electrode disposed in the panel proximate to the inner surface and surrounding the orifice, and electrically connected to a ring electrode voltage source, and first and second deflection control electrodes at least partially surrounding the orifice near the outer surface of the panel. In such embodiments, the first deflection control electrode electrically is connected to a first powder deflection voltage source operable to repeatedly cycle between a first minimum voltage, a first intermediate voltage, and a first maximum voltage. The first deflection control electrode is disposed on the outer surface of the panel and proximate to a first sector of a perimeter of the orifice at the outer surface of the panel, wherein the first sector of the perimeter is proximate and intermediate between an axis opposite the conveyance direction and an axis perpendicular to the conveyance direction. Additionally, the a second deflection control electrode is electrically connected to a second powder deflection voltage source operable to repeatedly cycle between a second minimum voltage, a second intermediate voltage, and a second maximum voltage. The second deflection control electrode is disposed on the outer surface of the panel and proximate to a second sector of a perimeter of the orifice at the outer surface of the panel, wherein the second sector of the perimeter is proximate and opposed to the first sector and proximate and intermediate between an axis in the conveyance direction and an axis perpendicular to the conveyance direction. The first and second powder deflection voltage sources are operated such that when the first powder deflection voltage source is at the first minimum voltage, the second powder deflection voltage source is at the second maximum voltage; and when the first powder deflection voltage source is at the first intermediate voltage, the second powder deflection voltage source is at the second intermediate voltage; and when the first powder deflection voltage source is at the first maximum voltage, the second powder deflection voltage source is at the second minimum voltage.

In certain embodiments, the first minimum voltage is equal to the second minimum voltage, the first intermediate voltage is equal to the second intermediate voltage, and the first maximum voltage is equal to the second maximum voltage. In such embodiments, the first and second powder deflection voltage sources may be cycled between minimum and maximum voltages at a frequency of $\nu$ cycles per second, wherein the platform drive system is operable to move the support substrate electrode relative to the powder aperture array in the conveyance direction at a velocity v such that a first set of powder dots deposited when the first powder deflection voltage source is at the first minimum voltage and the second powder deflection voltage source is at the second maximum voltage is such that the powder is deflected in a proximate direction that is both opposing and perpendicular to the conveyance direction. The support substrate electrode moves a distance $d=v/3\nu$ before deposition of a second set of powder dots when the first and second powder deflection voltage sources are at the first intermediate voltage. Additionally, the platform drive system may be operable to move the support substrate electrode relative to the powder aperture array in the conveyance direction such that the first and second sets of powder dots move an additional distance $d=v/3\nu$ at a time of deposition of a third set of powder dots when the first powder deflection voltage source is at the first maximum voltage, and the second powder deflection voltage source is at the second minimum voltage.

In certain embodiments, the apparatus may be further comprised of a second powder aperture array comprising a second plurality of powder dispensing apertures arrayed along a second axis perpendicular to the conveyance direction of the charged powder conveying surface. In such embodiments, the second plurality of powder dispensing apertures are offset from the first plurality of powder dispensing apertures along the second axis perpendicular to the conveyance direction.

In certain embodiments, the apparatus may be further comprised of a post-deposition station to operable consolidate or fuse object powder layers disposed on the object build platform.

In certain embodiments, the post-deposition station may be comprised of a first conductive material applicator directable to at least one of the support substrate surface of the object build platform and a surface of a powder layer of the object parallel to the support substrate surface, and a second conductive material applicator directable to a side wall surface of the object during formation of the object on the object build platform.

In certain embodiments, the post-deposition station may be comprised of a liquid conductive material dispenser. The liquid conductive material dispenser may include a liquid vessel containing a liquid conductive material such as an alcohol, an aqueous electrolyte solution, or mixtures thereof. The liquid conductive material may be further comprised of a surfactant and/or a binder polymer. The liquid conductive material dispenser may be comprised of at least one ink jet nozzle array traversable over the support substrate surface of the object build platform. In some embodiments, the liquid conductive material dispenser may be comprised of a first ink jet nozzle array directable to at least one of the support substrate surface of the object build platform and a surface of a powder layer of the object parallel to the support substrate surface, and a second ink jet nozzle array directable to a side wall surface of the object during formation of the object on the object build platform.

In certain embodiments, the post-deposition station may be comprised of a solid conductive material dispenser. The solid conductive material dispenser may include a solids holding vessel containing a solid conductive material selected from the group consisting of a conductive polymer, carbon black, graphite, graphene, graphene nanoplatelets, carbon nanowires, carbon nanotubes, fluorine-doped tin oxide, and indium tin oxide, and mixtures thereof. In some embodiments, the solid conductive material dispenser may be comprised of a first solid material applicator directable to at least one of the support substrate surface of the object build platform and a surface of a powder layer of the object parallel to the support substrate surface, and a second solid material applicator directable to a side wall surface of the object during formation of the object on the object build platform.

In certain embodiments, the source of charged powder for 2D layer deposition on a 3D object and support material may be comprised of a direct powder printer. Such printers include toner jet printers, direct electrostatic printers, digital packet printers and XeroJet dry powder printers. Exemplary toner jet printers are disclosed in e.g., U.S. Pat. Nos. 5,774,159, 5,036,341, 5,984,456 and 5,767,877. Exemplary direct electrostatic printers are disclosed in e.g., U.S. Pat. Nos. 4,814,796, 4,755,837, and 4,876,561. Exemplary digital packet printers are disclosed in e.g., U.S. Pat. Nos. 5,153,617, 5,287,127, 5,400,062, and 6,309,049. An exemplary XeroJet printer is disclosed in U.S. Pat. No. 6,416,171. The disclosures of these United States Patents are incorporated herein by reference.

In some embodiments, multiple direct electrostatic printers are operable to dispense a plurality of powders upon the powder transferring surface of the powder transferring member, including powders of at least three colors (such as cyan, yellow, and magenta), a black powder, a white powder, and a support powder.

In accordance with the present disclosure, there is also provided an object as an article of manufacture. The object may have a wide variety of three-dimensional shapes. The object is comprised of an alternating sequence of layers of object structural material and a layer of electrically conductive material. The layers of object structural materials on the object are formed by repeating the steps of sequentially depositing powder layers onto a support substrate; fusing the layers to form a portion of the object, and depositing the layer of electrically conductive material onto a top layer of the portion of the object and electrically connected with the conductive support substrate. The object building may be continued with repeating alternating deposition of structural material layers interspersed with a conductive layer.

The electrically conductive material may be a liquid material selected from the group consisting of alcohols, an aqueous electrolyte solution, and mixtures thereof. The electrically conductive material may be further comprised of a surfactant and/or a binder polymer. The electrically conductive material may be a solid material selected from the group consisting of a conductive polymer, carbon black, graphite, graphene, graphene nanoplatelets, carbon nanowires, carbon nanotubes, fluorine-doped tin oxide, and indium tin oxide, and mixtures thereof. The electrically conductive material may be formulated such that the layer of electrically conductive material is temporarily present between layers of object structural materials, and is absent in the object in a finished state.

The layers of object structural materials may be comprised of powders selected from the group consisting of a first primary color powder, a second primary color powder, a third primary color powder, an additional color powder, a black powder, a white powder, and a support powder. The primary colored powders may be yellow, cyan, and magenta powders. The support powder material may be removed from the object by application of a solvent, thereby causing at least one of voids or overhangs in the object in a finished state.

BRIEF DESCRIPTION OF THE DRAWINGS

The present disclosure will be provided with reference to the following drawings, in which like numerals refer to like elements, and in which:

FIG. 12 is a schematic illustration for the cross-section of a 3D object in which the surface layer of the object is colored and the adjacent surface underlayer is formed with a white powder.

Figure 1:
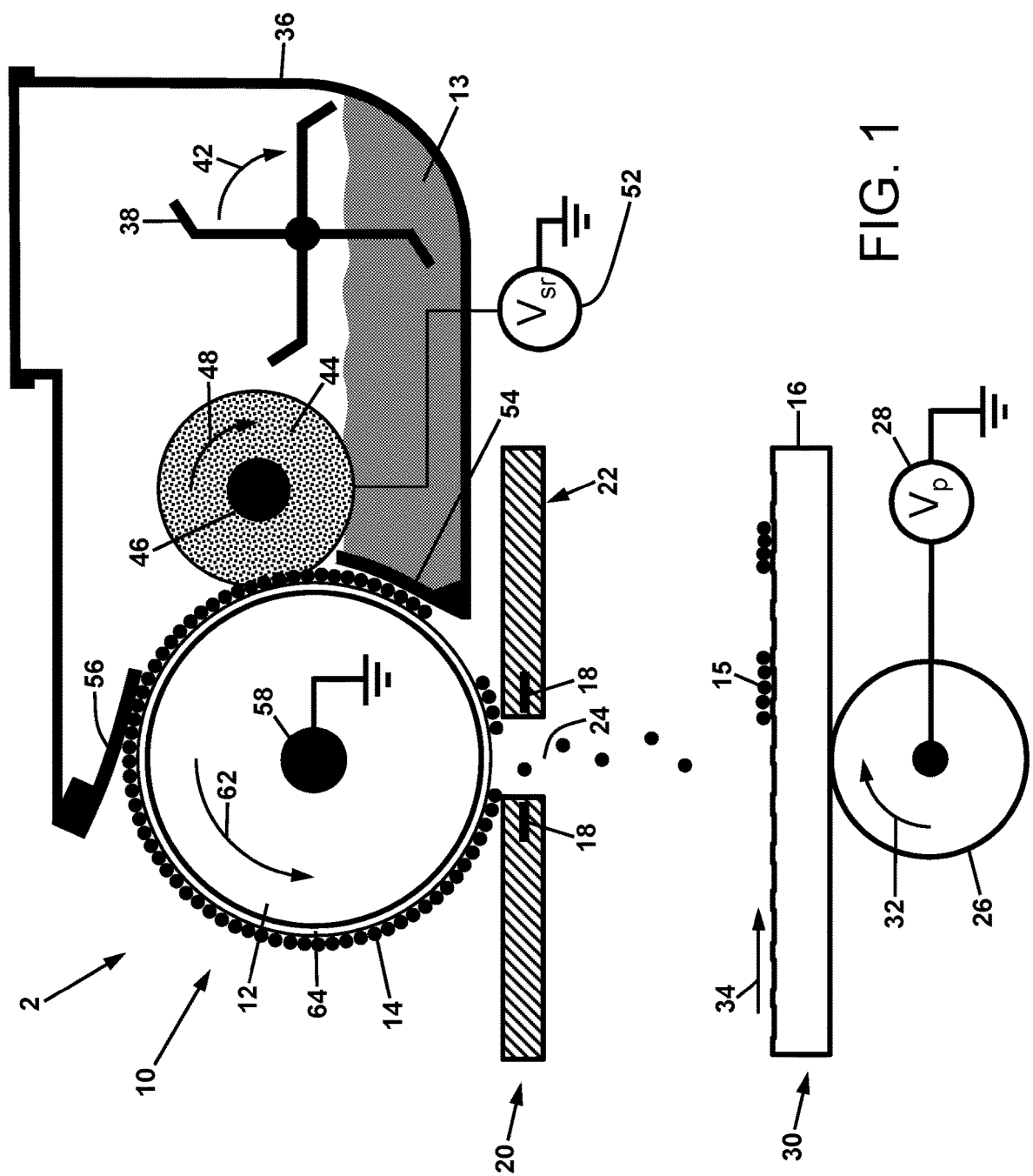
FIG. 1 is a schematic illustration of a direct powder deposition document printer.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. It is to be understood that the overall scale of the drawings and the relative sizes of particular features are as shown for the sake of clarity of illustration, and may vary from that shown. Additionally, this disclosure may identify certain components with adjectives such as "top," "upper," "bottom," "lower," "left," "right," etc. These adjectives are provided in the context of the orientation of the drawings, which is not to be construed as limiting the apparatus disclosed herein to use in a particular spatial orientation.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

As used herein, the term "support material" is meant to indicate a material that is co-deposited with the material(s) to be used in forming a three-dimensional (3D) object using the apparatus and methods of the present disclosure. In fabricating a 3D object, support material is deposited in a layer along with the materials of the 3D object for the purpose of providing support for subsequently deposited layers, and in particular, for locations in a subsequent layer immediately above the support material that will comprise a portion of the 3D object. After the entire layer deposition process is complete to form the 3D object, support materials are typically removed, such as by using a solvent that dissolves them away, leaving only the 3D object behind.

To fully illustrate the practice and benefit of additive manufacturing of a 3D object and support material via the direct deposition of triboelectric charged, non-conductive powder onto a 3D part and support structure that is repeatedly rendered sufficiently conducting either temporarily or permanently, a detailed description of certain preferred embodiments is provided. In certain embodiments, the direct powder deposition method can typically produce 2D powder layers of the size of approximately 21 cm by 28 cm at rates up to approximately 20 layers per minute, which is equivalent to a process speed of about 15 ft/min. This printing rate provides about one powder layer every 3 seconds. If each powder layer is approximately 25 microns (μm) thick, a 9.0 cm high 3D object can be fabricated in about 3 hours at a rate of 3.0 cm per hour. It should be noted, however, that the intrinsic rate is reduced when building an object on a single platform since periodic post-deposition steps such as fusing the powder layer are required. Assuming the fusing of each powder layer requires about 1 second, the build rate is reduced to about 2.3 cm per hour. Alternative build rates are contemplated. For example, one may refer to the build rates and the analysis thereof as disclosed in commonly owned copending U.S. patent application Ser. No. 14/994,180, the disclosure of which is incorporated herein by reference.

For the purposes of understanding certain direct powder deposition embodiments of the apparatus and methods of the present disclosure, a summary of a direct charged powder deposition document printer will first be presented. Referring to FIG. 1, a schematic illustration is shown of a direct charged powder deposition document printer for producing prints on a print medium such as paper or an intermediate belt for subsequent electrostatic transfer (not illustrated) of the charged powder to paper. A number of printers can be ganged together in tandem to form a full-color printer (cyan, magenta, yellow and black printers) as described by Sandberg in a publication on "TonerJet® Tandem Color has Reached Prototype Stage" published in the conference proceedings of the Society for Imaging Science and Technology (IS&T), *NIP*14: 1998 *International Conference on Digital Printing Technologies*, pp. 180-183. A direct charged powder deposition printer 2 as illustrated in FIG. 1 contains a number of subsystems as illustrated in the figure by the numerals 10, 20 and 30. The subsystem 10 enables the deposition of a layer of triboelectric charged, non-conductive powder 14 on the surface of a rotating cylinder referred to as donor roll 12. The subsystem 20 is an aperture array 22 in close proximity to the charged powder 14 deposited on donor roll 12 that controls both the electrostatic detachment of powder 14 from the donor roll 12 and the projection of the detached powder through the apertures. The subsystem 30 includes the print medium 16 and a conductive roll 26 connected to a power supply 28, which provides a deposition electric field that provides an electrostatic force for acting on the charged powder 14 in the spacing between the aperture array 22 and print medium 16. The powder-coated medium 16 passes through a fusing system (not shown) that binds the deposited charged powder 15 to the medium 16 through a combination of heat and pressure.

The subsystem 10 comprises a number of components that enable the deposition of triboelectric charged, non-conductive powder 14 on the surface of the donor roll 12. The conductive donor roll 12 rotates about a shaft 58 in the direction of arcuate arrow 62. The shaft 58 and donor roll 12 are shown to be at ground potential, but in general they can also be biased at a non-zero potential. The donor roll 12 may include a charge-relaxable overcoating 64, such as anodized aluminum. To supply triboelectric charged non-conductive powder to the donor roll 12, a powder hopper 36 is configured to contain uncharged powder 13. Within the powder hopper 36, a paddle wheel 38 rotating in the direction of arcuate arrow 42 urges the uncharged powder 13 towards the donor roll 12. A supply roller 44 in rubbing contact with the donor roll 12 rotates in the direction of arcuate arrow 48 to coat and triboelectrically charge powder 14 on donor roll 12. The supply roller 44 is typically made of compliant, conductive foam or rubber on a shaft 46. The power supply 52 connected to the supply roller shaft 46 is biased with a polarity that provides an electrostatic force acting on the powder in the direction that promotes the deposition of the desired triboelectrically charged powder on the donor roll 12. A metering blade 56 in the form of a compliant overhung doctor blade provides a uniform charged powder layer 14 on the rotating donor roll 12. If the metering blade 56 material is semi-conducting or conducting, an electrical bias such as that provided by power supply 52 can be applied to the blade 56 to facilitate triboelectric charging of powder 14. A powder seal 54 is provided in the region where charged powder 14 returns to the powder hopper 36. The seal prevents uncharged powder 13 leaking from the hopper 36. If the seal 54 material is semi-conducting or conducting, an electrical bias such as that from power supply 52 can also be applied to the seal 54 to facilitate return of charged powder 14 to the powder hopper 36. The donor roll 12, paddle wheel 38 and supply roller 44 are connected to a drive motor (not shown) for rotation in the respective directions of arrows 62, 42 and 48 through the configuration of a gear train (not shown) on the ends of subsystem 10. To provide a sufficient supply of charged powder 14 to the print medium 16, the surface speed of the donor roll 12 should be several times greater than the speed of the print medium 16.

The subsystem 20 illustrated in FIG. 1 is an aperture array 22 in close proximity to the charged powder 14 deposited on the donor roll 12. The aperture array 22 is preferably fabricated from a flexible printed circuit board (FPCB) that enables the FPCB to be partially wrapped around the donor roll 12 and self-spaced by the thickness of the charged powder layer 14. In this manner, the spacing between the print ring electrodes 18 and donor roll 12 is maintained independent of any runout in the donor roll 12. Furthermore, the relative close distance between the print ring electrodes 18 and donor roll 12 enables the application of high electric fields for modest ring control voltages. High electric fields are desired for efficient electrostatic detachment of charged powder 14 from the donor roll 12. In addition, a high detachment electric field assists in the injection of the charged powder 14 into the space between the aperture array 22 and print medium 16. Thus, control voltages applied to each print ring electrode 18 surrounding each aperture 24 control both the electrostatic detachment of powder 14 from the donor roll 12 and the projection of the detached powder through the aperture 24.

The subsystem 30 includes the print medium 16 coated with deposited charged powder 15 and a conductive roll 26 connected to a power supply 28 that provides a deposition electric field acting on the charged powder injected into the spacing between the aperture array 22 and print medium 16. The print medium 16 is transported in the direction of arrow 34 by suitable conveying means (not shown). The conductive roll 26 rotates in the direction of arrow 32 such that its surface speed is synchronous with the transport speed of the print medium 16.

Figure 2:
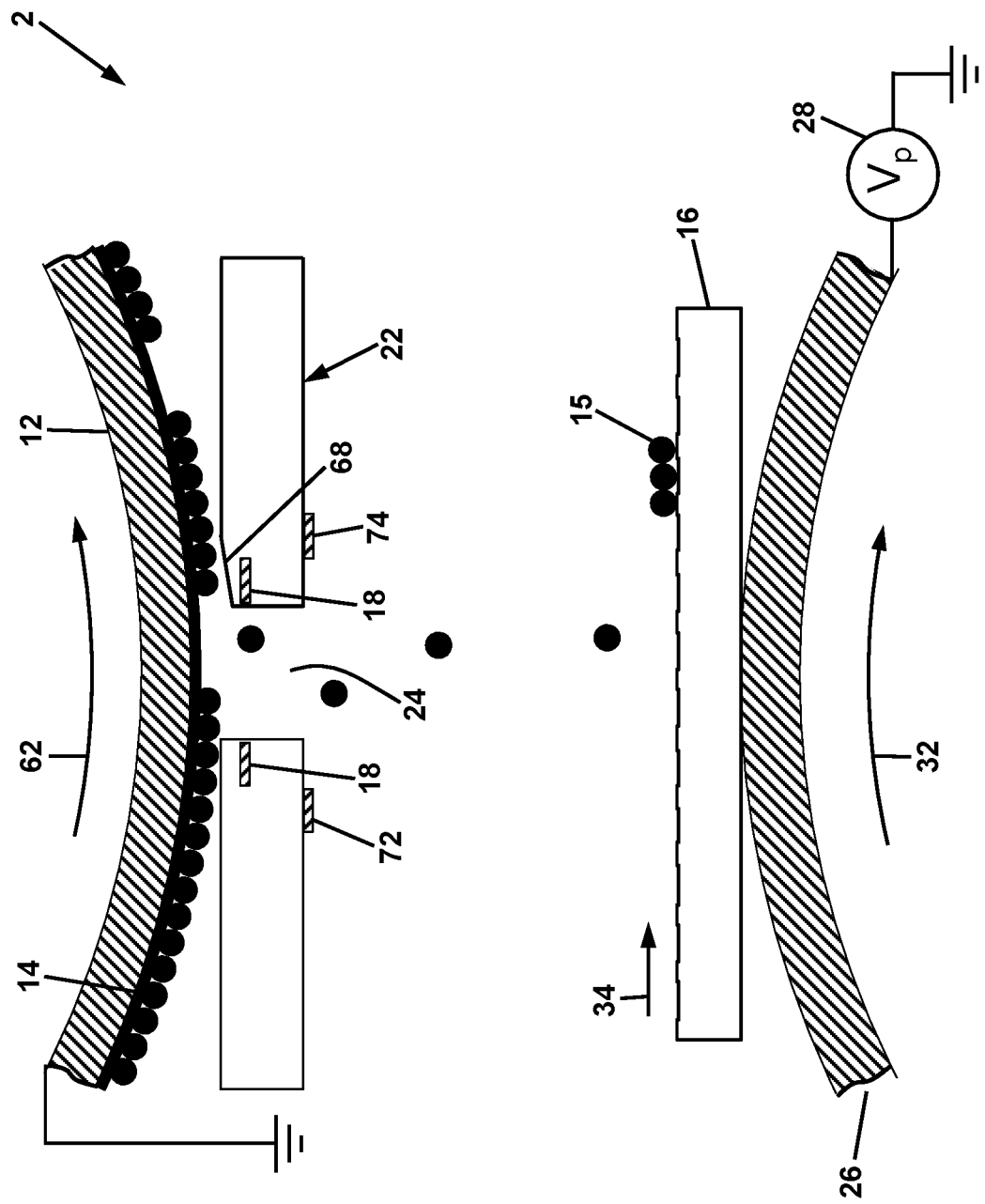
FIG. 2 is a schematic expanded illustration of the printer of FIG. 1 further comprising deflection control electrodes.

FIG. 2 provides a more detailed illustration of a particular aperture 24 within an aperture array 22. The aperture array formed as a FPCB 22 is self-spaced from the donor roll 12 by the thickness of the charged powder layer 14. The print ring control electrode 18 around the aperture 24 is embedded in the FPCB by an overlayer coating on the FPCB 22 that prevents wear and powder filming, as well as any charge accumulation. To prevent charged powder 14 from being mechanically detached at the edge of the downstream side of the aperture 24, the surface of the FPCB 22 near the edge of the aperture that is downstream with respect to the direction of rotation 62 of the donor roll may include a tapered region 68 so that any charged powder 14 does not make physical contact with the edge that otherwise could cause powder detachment with a mechanical force.

Figure 3:
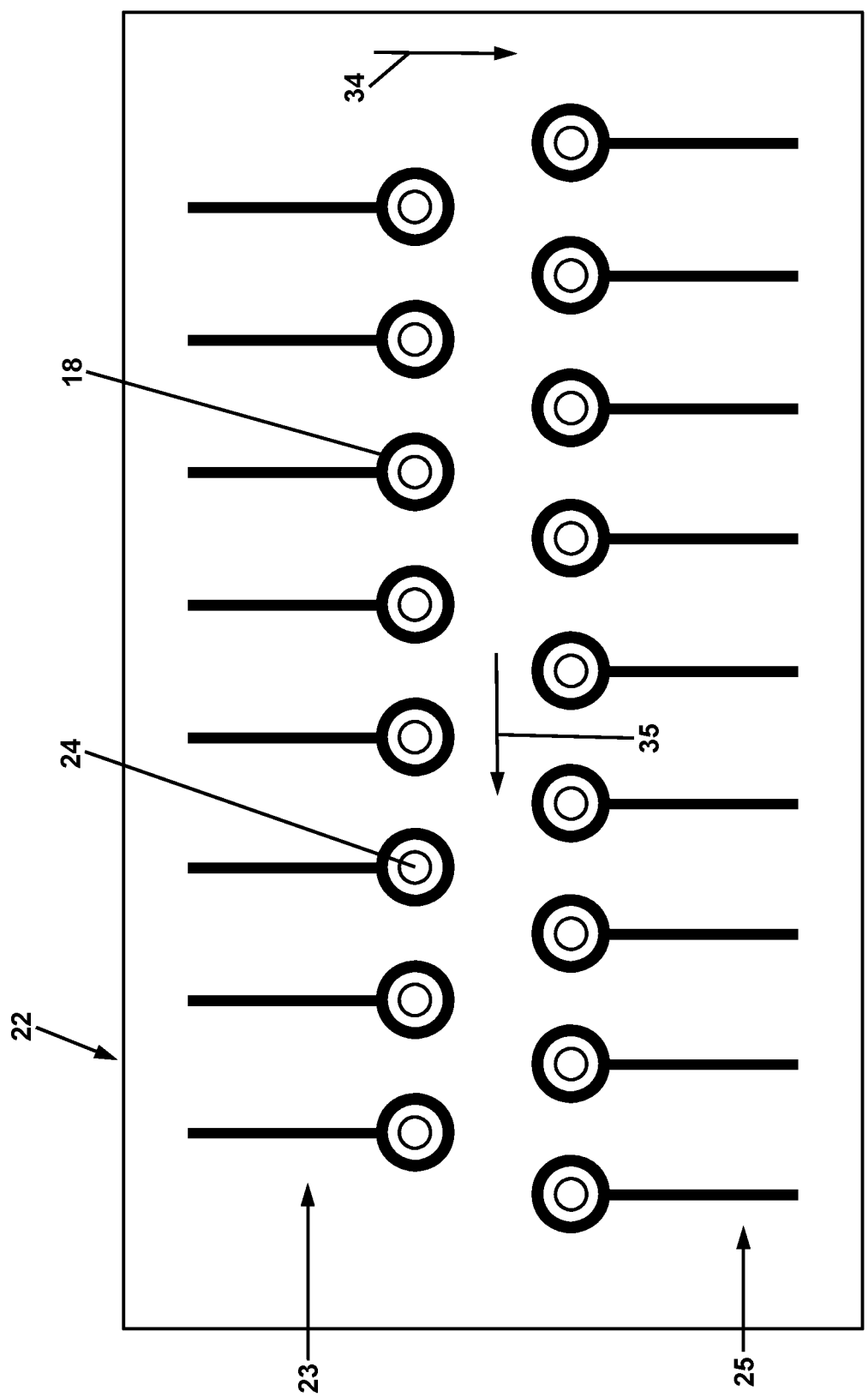
FIG. 3 is a schematic of an aperture array with print ring control electrodes formed near the side of a flexible printed circuit board adjacent to the charged powder source.

High-resolution printing technologies usually require addressability of about 600 dots per inch (dpi). This implies that for direct charged powder deposition printing systems in which a dot is formed by a single aperture, the number of apertures in the cross process direction should be on the order of 600 dpi. Considering the need for a print ring control electrode around each aperture, it is not feasible to arrange the apertures with print ring control electrodes in a single row. Rather, it is preferable to arrange the apertures in two or more rows that enable increased spacing between the apertures in the cross-process direction indicated by arrow 35 in FIG. 3. FIG. 3 shows a plan view of the aperture array 22 with two rows 23 and 25 of apertures 24, each of which is surrounded by a print ring electrode 18. The apertures 24 of row 23 are offset midway with respect to the apertures of row 25 in the cross-process direction 35 to provide the desired 600 dpi addressability for the set 23 and 25 of row apertures 24. It should be noted, however, that for this architecture, each print ring electrode 18 requires a separate high-voltage driver that adds cost and complexity to the electronics.

For the purpose of reducing the number of apertures 24 and print ring electrode drivers, an alternative architecture for the aperture array 22 is proposed herein, in which dot deflection control (DDC) electrodes are incorporated to provide powder deposition at three adjacent dots per aperture in the cross-process direction 35. One third of the number of print ring electrode drivers is required for this architecture. FIG. 2 illustrates dot deflection control electrodes 72 and 74 on the side of the FPCB 22 that faces the print medium 16.

Figure 4:
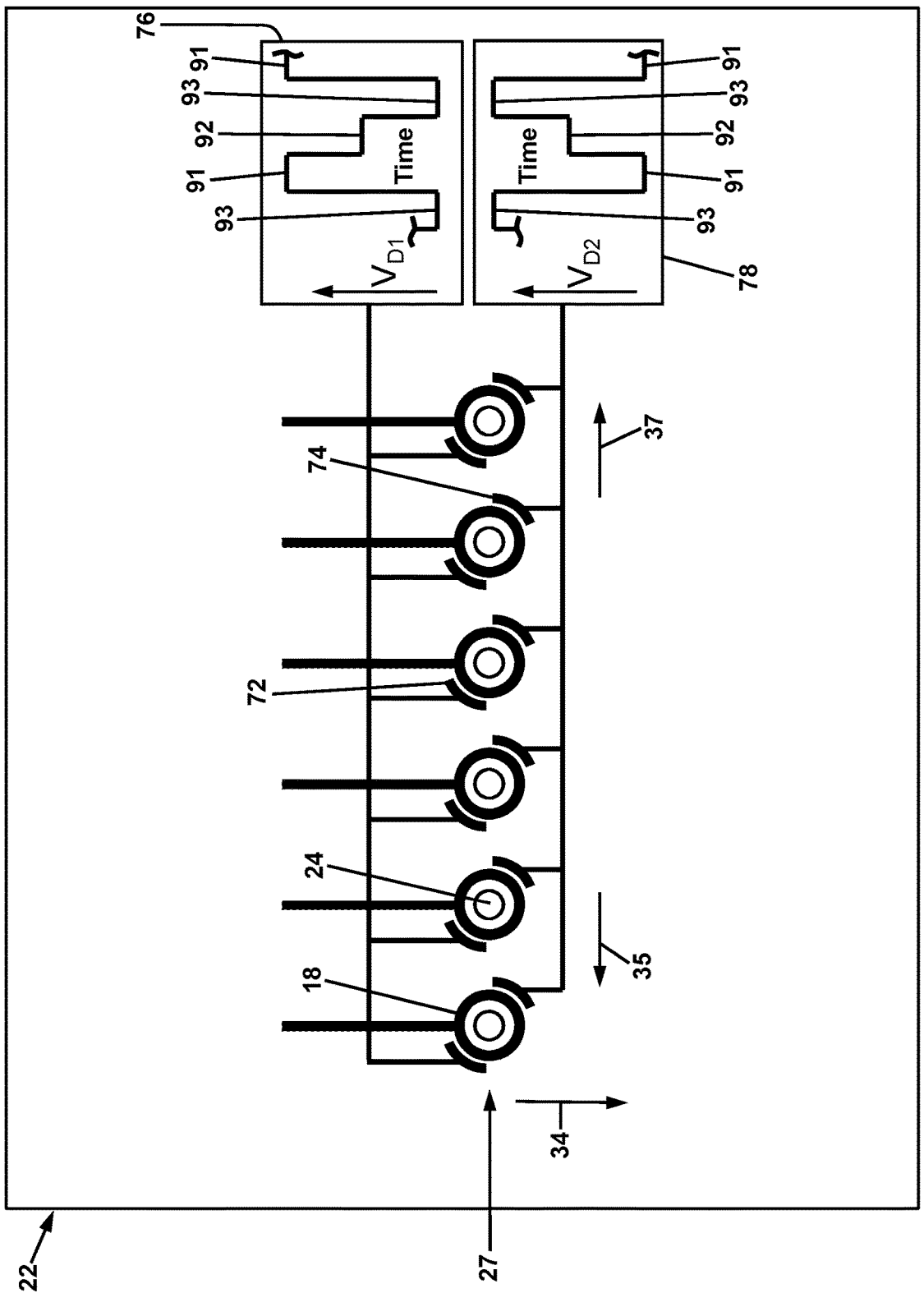
FIG. 4 is a schematic of an aperture array with dot deflection control electrodes on the side of a flexible printed circuit facing the media substrate.

FIG. 4 also shows a plan view of dot deflection control electrodes 72 and 74 for a row of apertures 27. The DDC electrodes 72 are connected to a voltage source 76 of $V_{D1}$ with a voltage versus time dependence illustrated in FIG. 4. The DDC electrodes 74 are connected to a voltage source 78 of $V_{D2}$ with a voltage versus time dependence also illustrated in FIG. 4. The time dependence of each voltage source is divided into three time segments of 91, 92, and 93. When printing is desired at a particular aperture 24 during a particular time segment, the print control voltage applied to the particular print ring electrode 18 is switched to a printing voltage at the beginning of the time period. The duration of the printing voltage applied within the particular time segment controls how much charged powder 14 passes through aperture 24.

During the first time period 91 in which the voltage 76 of $V_{D1}$ on electrodes 72 is more positive than the voltage 78 of $V_{D2}$ on electrodes 74, there is a lateral electric field at each aperture 24 that causes a deflection of any negatively charged powder passing through the respective apertures 24 in a direction that is both opposite to the process direction 34 and in the cross-process direction indicated by arrow 35. During a second time period 92, the voltage applied to both DDC electrodes 72 and 74 at each aperture 24 is at the same level. Under these conditions, there is no electric field that causes lateral deflection of any charged powder passing through each aperture 24. During the third time period 93 in which the voltage 76 of $V_{D1}$ on electrodes 72 is more negative than the voltage 78 of $V_{D2}$ on electrodes 74, there is a lateral electric field that causes a deflection of any negatively charged powder passing through the respective aperture 24 in a direction that is both in the process direction 34 and in the cross-process direction indicated by arrow 37.

The amount of charged powder deflection at the print medium 16 in the cross-process directions of 35 and 37 depends on such factors as the geometry of the DDC electrodes 72 and 74, the differential in deflection voltages, and the average charge and size of the powder. The amount of deflections, within the printer frame of reference, can be adjusted to print a continuous line of dots on medium 16 in the cross-process directions 35 and 37.

Figure 5:
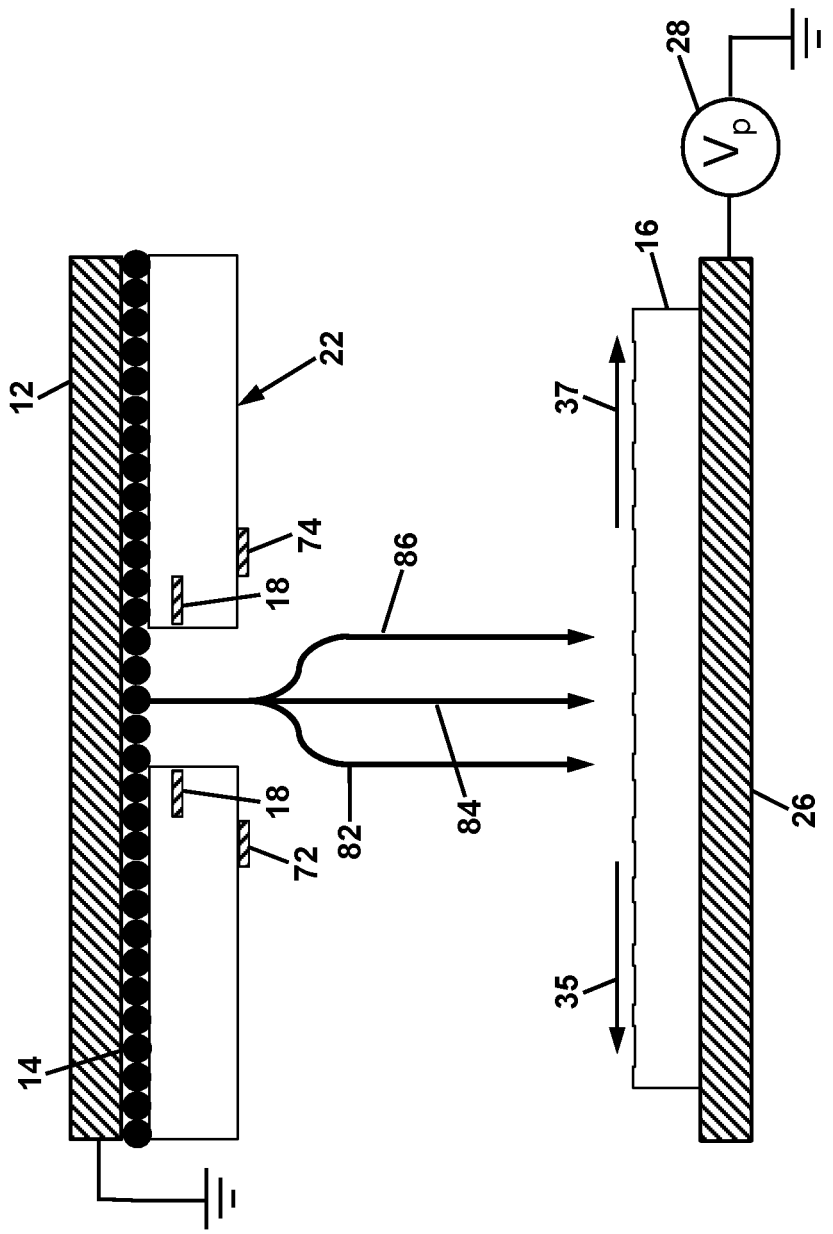
FIG. 5 is a schematic of an aperture array with deflection control electrodes that control the placement of powder deposition on the print medium, as illustrated by three trajectories.

FIG. 5 is a view of the charged powder deposition zone taken in view of the cross-process directions of 35 and 37 of FIG. 4 that illustrates the three charged powder trajectories enabled by DDC electrodes. Trajectory 82 illustrates the first time period 91 that results in deflection of charged powder opposite to the process direction 34, and in the cross-process direction 35. Trajectory 84 illustrates the second time period 92 of no deflection with respect to the process direction 34, nor in either of the cross-process directions 35 and 37.

Trajectory 86 illustrates the third time period 93 that results in deflection in the process direction 34, and in the cross-process direction 37.

In operation of the apparatus of the present disclosure for a particular aperture, all three adjacent dots from trajectories 82, 84, and 86 can be printed on medium 16 in a line in the cross-process directions 35 and 37 if the printing voltage applied to a particular ring control electrode 18 is momentarily switched on and subsequently off beginning with each time period 91, 92 and 93. Printing of three adjacent dots in the cross-process direction requires the time period between switching the printing voltage on and off during each of the time periods 91, 92 and 93 to be equal to a time calculated by dividing the amount of dot deflection at medium 16 during time periods 91 and 93 by the process speed of medium 16.

Figure 6A:
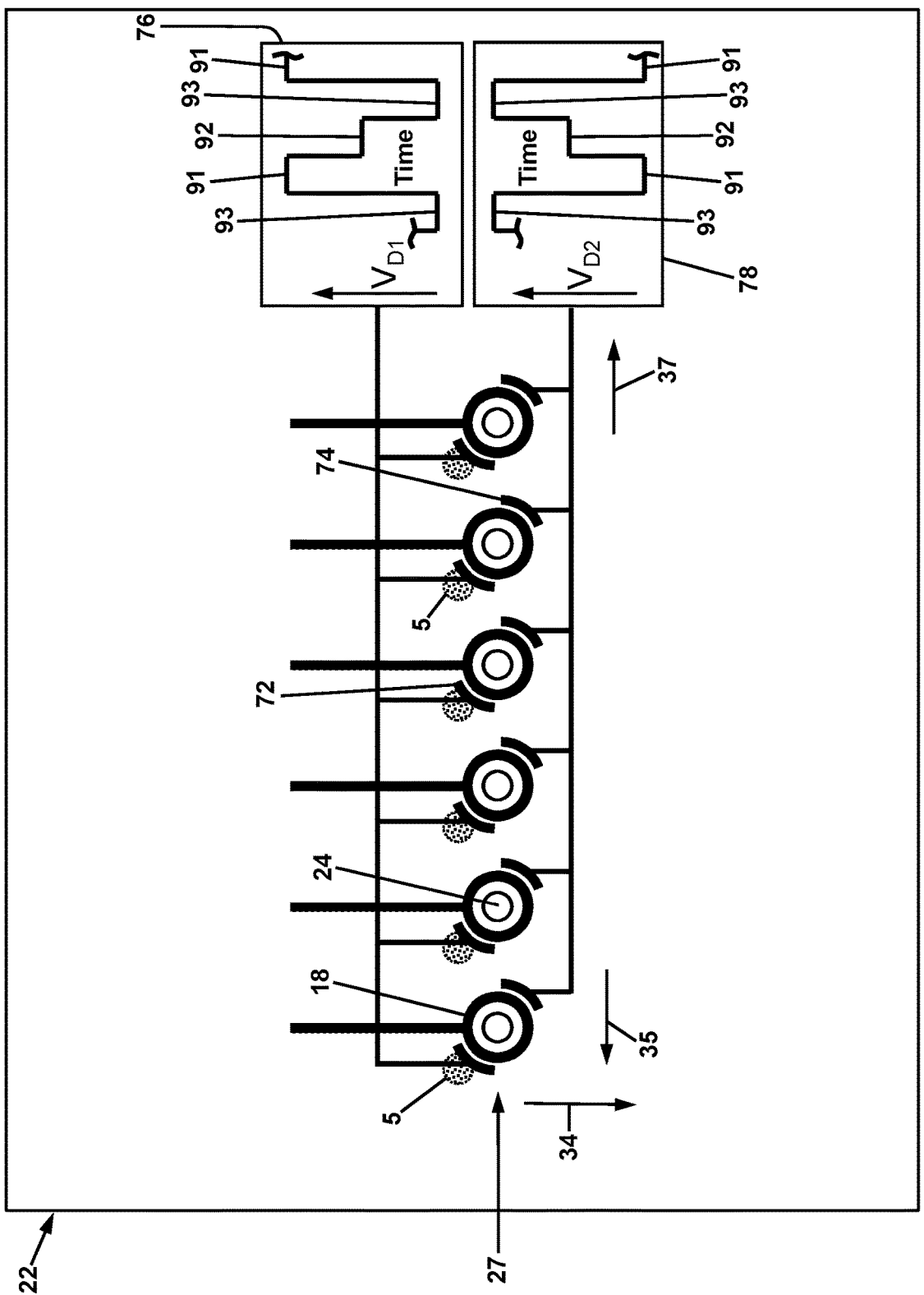
FIGS. 6A-6C depict a sequence of depositions of powder dots upon a substrate using the aperture array of FIG. 4, for the purpose of forming a layer of a three-dimensional object.
Figure 6B:
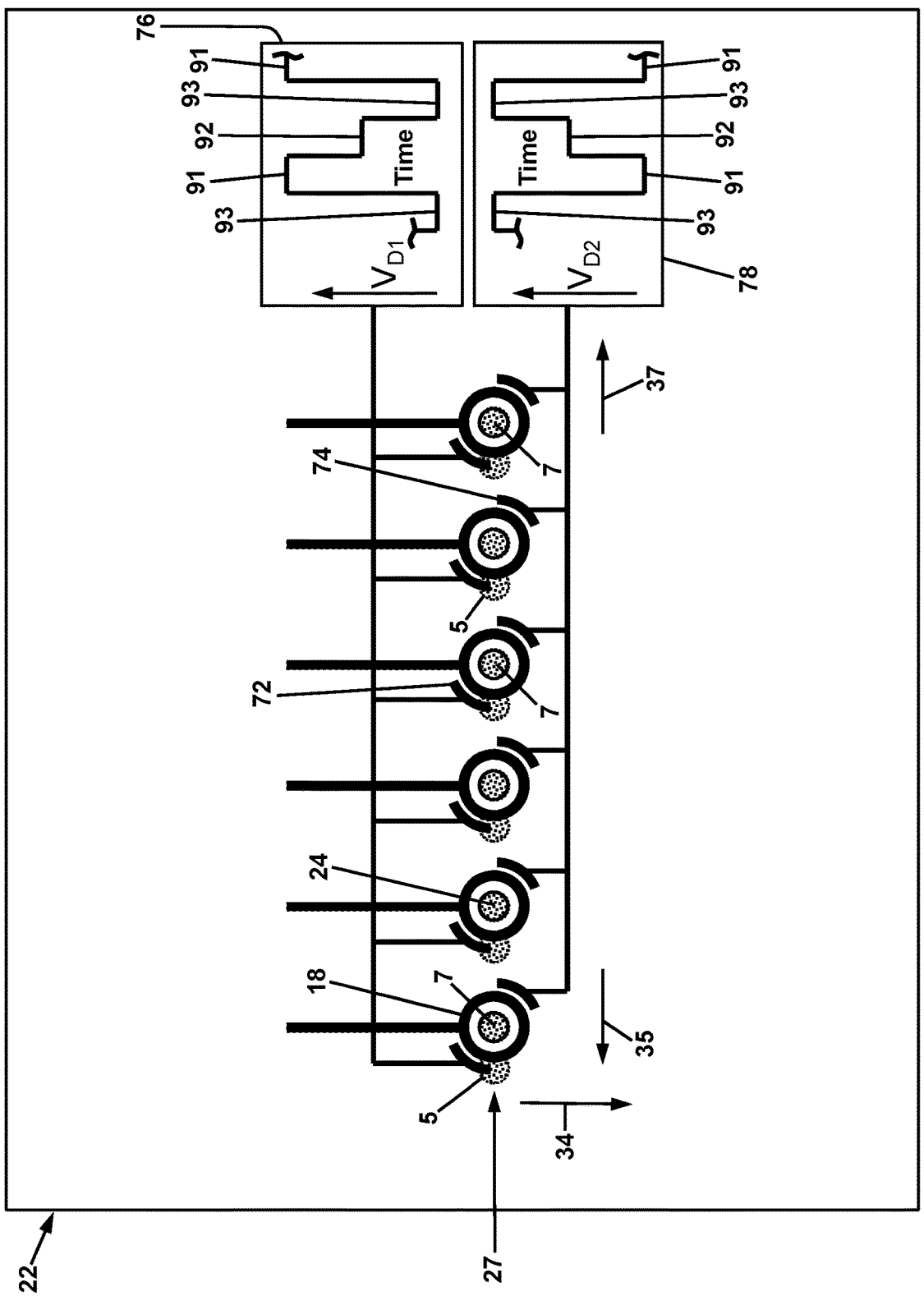
Figure 6C:
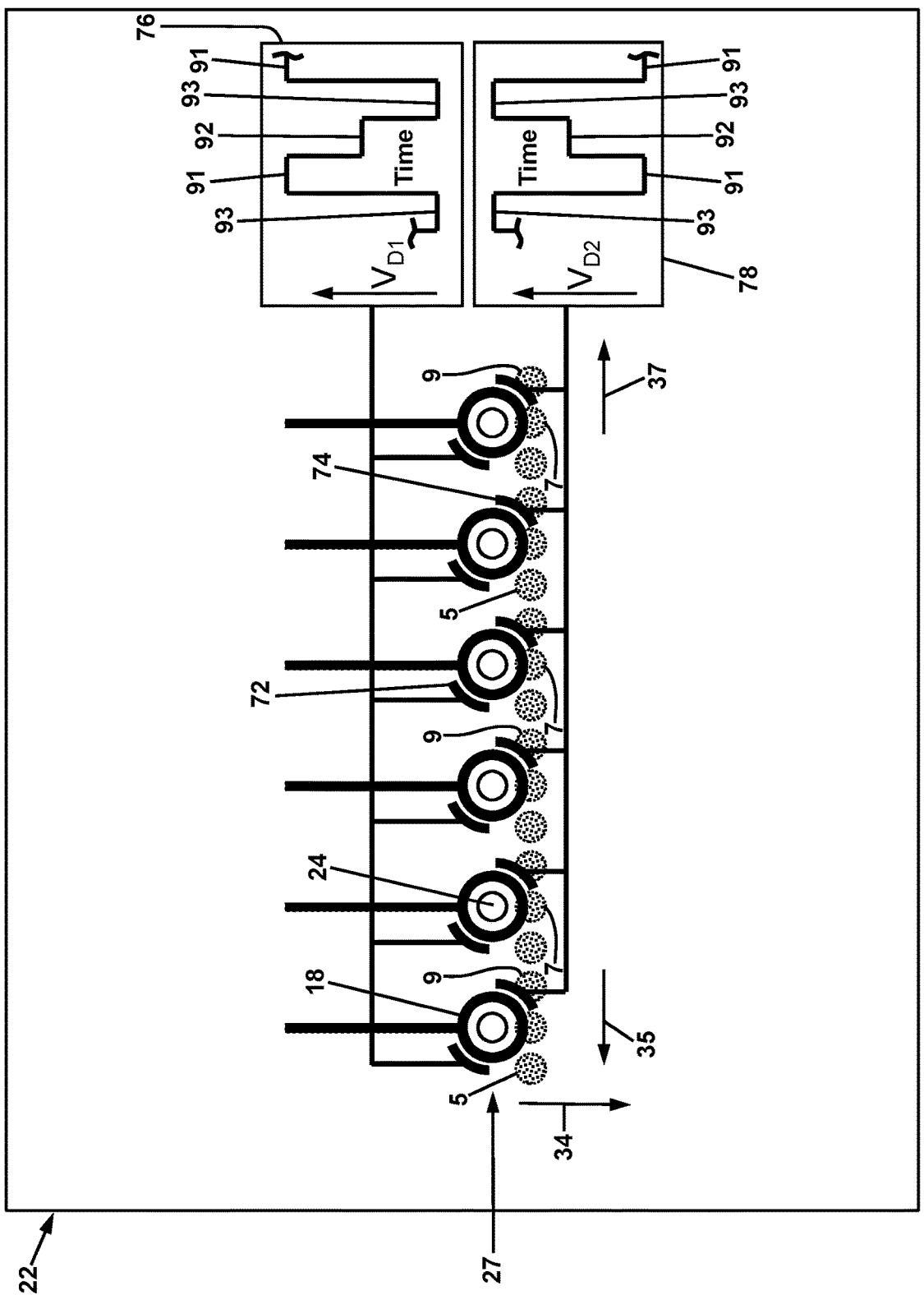

This is best understood with reference to FIGS. 6A, 6B, and 6C, which illustrate deposition of a sequence of powder dots that occurs over a sequence of the time periods 91, 92, and 93, respectively, for a powder that is charged negatively. (It is to be understood that the powder dots 5, as well as dots 7 and 9 of FIGS. 6B and 6C, are not necessarily drawn to scale, and may be smaller than shown with respect to the components of the aperture array 22. The dots are presented as shown for clarity of illustration.) During the time period 92, the voltages of $V_{D1}$ and $V_{D2}$ applied to the DDC electrodes 72 and 74, respectively, are at the same level as illustrated in FIG. 4. Referring first to FIG. 6A, powder dots 5 are deposited on the substrate 16 during time period 91. During this time period 91, voltage $V_{D1}$ is biased more positively, and voltage $V_{D2}$ is biased more negatively, as indicated by the voltage plots for respective voltage supplies 76 and 78. This causes the negatively charged powder dispensed from apertures 24 to follow trajectory 82 of FIG. 5. The dots 5 from the aperture row 27 are deposited opposite to the process direction 34, and in the cross-process direction 35, relative to the apertures 24.

Referring next to FIG. 6B, powder dots 7 are deposited on the substrate 16 during time period 92. During this time period 92, voltage $V_{D1}$ and voltage $V_{D2}$ are at the same level, as indicated by the voltage plots for respective voltage supplies 76 and 78. This results in the negatively charged powder dispensed from apertures 24 following trajectory 84 of FIG. 5. The dots 7 from the aperture row 27 are deposited directly beneath the apertures 24. However, because time period 92 follows time period 91, the dots 5 have indexed in the process direction 34, i.e., the direction that the substrate 26 is moving. Thus the dots 5 and dots 7 are deposited adjacent to each other and aligned in the cross process direction 37 on the substrate 26.

Referring next to FIG. 6C, powder dots 9 are deposited on the substrate 16 during time period 93. During this time period 93, voltage $V_{D1}$ is biased more negatively, and voltage $V_{D2}$ is biased more positively, as indicated by the voltage plots for respective voltage supplies 76 and 78. This causes the negatively charged powder dispensed from apertures 24 to follow trajectory 86 of FIG. 5. The dots 9 from the aperture row 27 are deposited in the process direction 34, and in the cross-process direction 37, relative to the apertures 24. However, because time period 93 follows time period 92, the dots 5 and 7 have indexed in the process direction 34. Thus the sets of dots 5, dots 7, and dots 9 of aperture row 27 are deposited adjacent to each other and aligned in the cross process directions 35 and 37.

With the sequence of time periods 91, 92, and 93 being performed in repeated cycles, repeating powder dot patterns, including but not limited to lines of dots sequenced along the process direction 34 can be deposited, each of the lines of dots disposed across the substrate 16 in the cross-process directions 35 and 37. In certain embodiments, multiple rows of apertures may be provided, such as shown in FIG. 3, with the aperture rows being offset from each other in the cross process direction. In that manner, full coverage of the substrate with powder dots in a single traverse past the aperture array 22 can thus be attained (if it is desired that the particular layer of the 3D object is to be a contiguous solid layer at that layer location).

In order to obtain a better understanding of the apparatus for a direct charged particle deposition printer 2 as illustrated in FIG. 2, it is useful to provide some typical dimensions of various elements, as well as the range of voltages applied to different types of electrodes. With reference to FIG. 2, the donor roll 12 is shown to be at ground potential even though in general it can be set at a non-zero voltage. The aperture array 22 is typically a flexible printed circuit board of thickness in the range of 50 to 150 micrometers (μm) thick and self-spaced from the donor roll 12 by the powder layer 14. Since the powder layer 14 is typically 10 to 25 μm thick, the separation between the aperture array 22 and donor roll 12 is comparable. Since the print ring electrodes 18 are embedded within the aperture array 22 at a depth of about 10 μm, the distance between print ring electrodes 18 and donor roll 12 is typically 20 to 35 μm. For an aperture array 22 with dot deflection control and two rows of apertures, a typical diameter of the circular apertures 24 is in the range of 50 to 150 μm.

The thickness of the print medium 16 is typically in the range of 100 to 150 μm thick. The spacing between the print medium 16 and aperture array 22 is typically approximately 400 μm. This implies that the spacing between the conductive roll 26 and the aperture array 22 is typically 500 to 550 μm.

Figure 7:
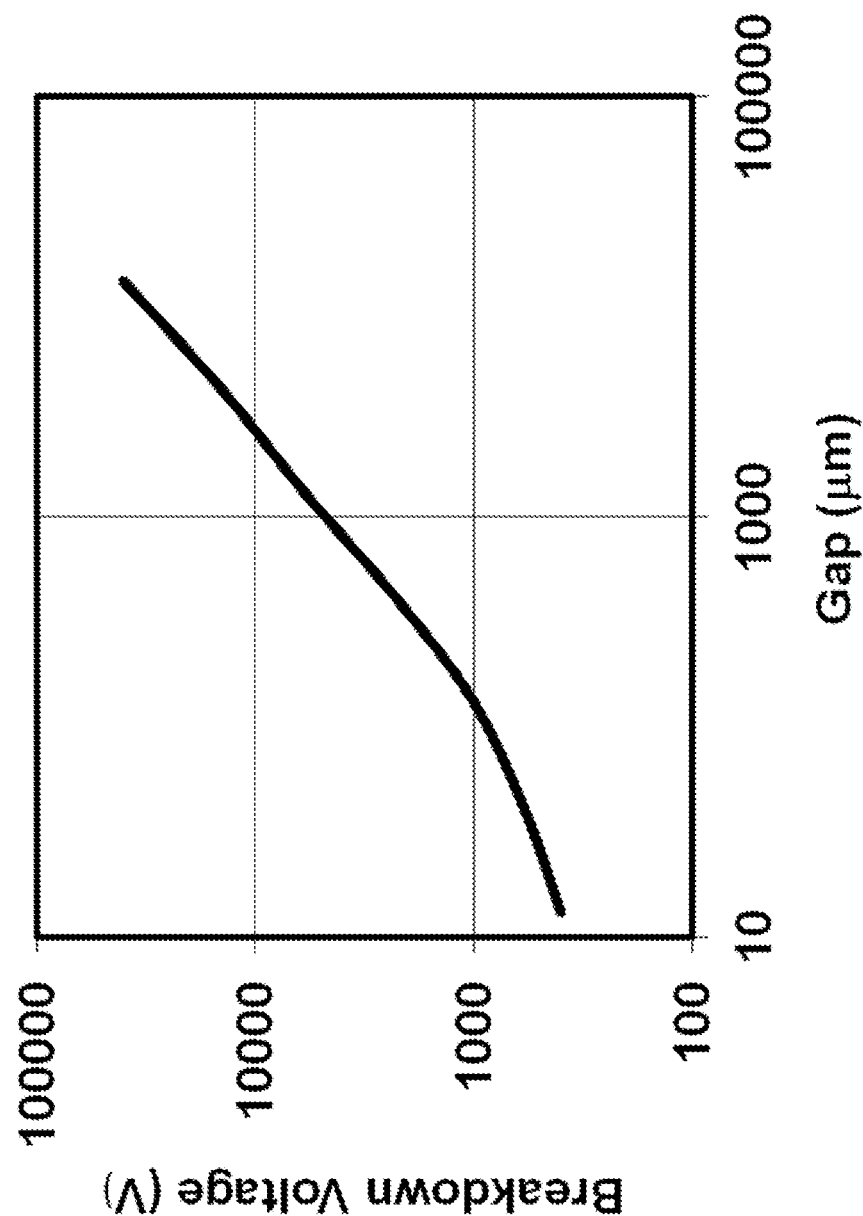
FIG. 7 is the dependence of the Paschen curve for air breakdown voltage as a function of the gap between parallel electrodes in 1 atmosphere of air pressure.
Figure 8:
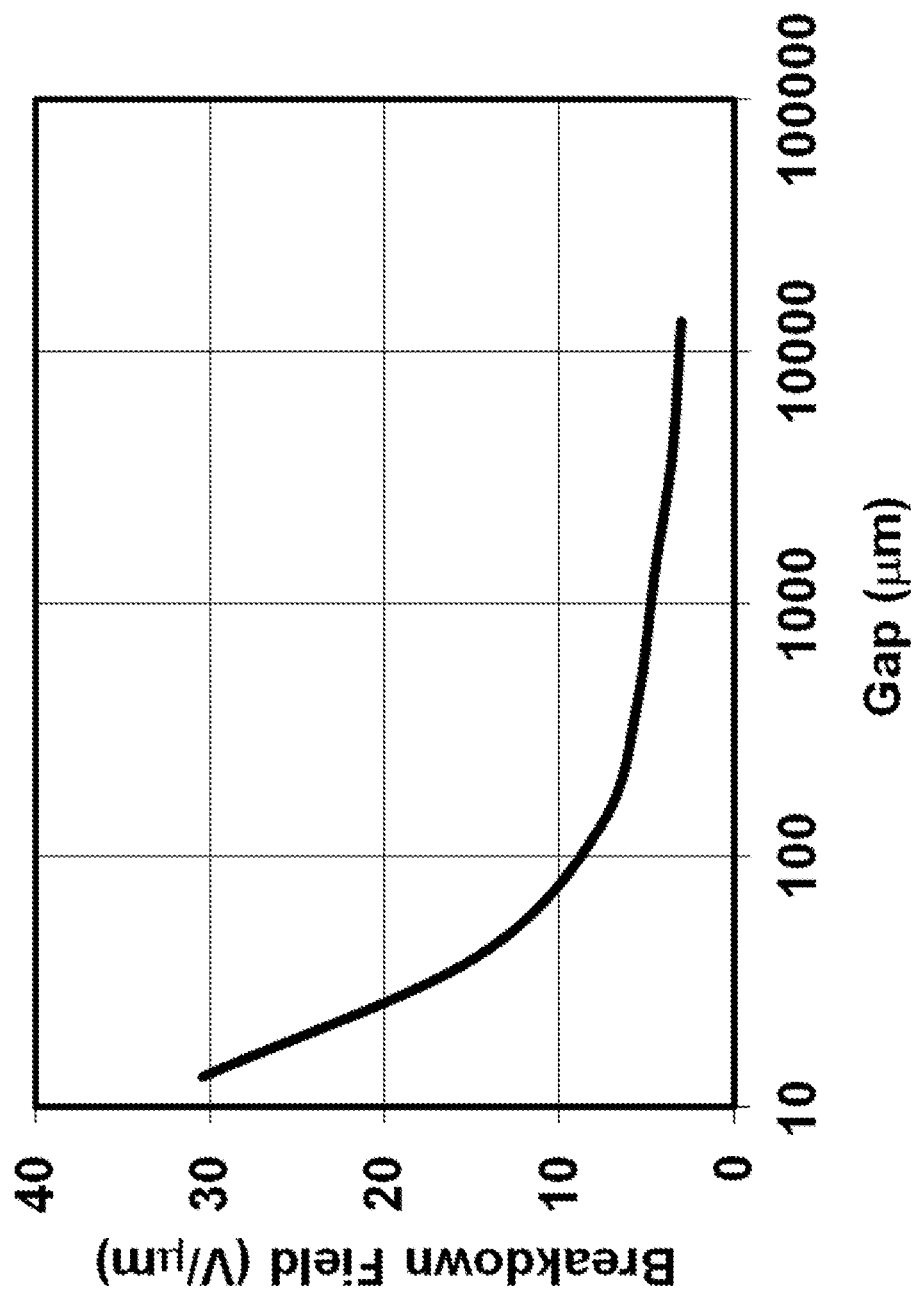
FIG. 8 is the dependence of the Paschen curve for air breakdown electric field as a function of the gap between parallel electrodes in 1 atmosphere of air pressure.

The maximum applied voltage and consequently electric field in the air gaps are limited by air breakdown for charged powder detachment by the print ring electrode voltage as well as the voltage applied to the conductive roll 26 for projection and deposition of the charged powder 14 on the print medium 16. For the range of air gap spacings used in the direct charged powder deposition printer 2 as illustrated in FIG. 2, higher electric fields can be obtained for smaller air gaps without air breakdown limitation. To understand the air breakdown limitations, it is informative to describe the Paschen curves for air breakdown across an air gap formed between parallel electrodes in 1 atmosphere of air pressure. FIGS. 7 and 8 illustrate log-log plots for the breakdown voltage and breakdown electric field as a function of the air gap. The air breakdown voltage increases with increasing gap from a minimum of about 330 V at a gap of 8 μm (not shown) to 30,000 V at a gap of 1 cm. The air breakdown electric field as calculated by the ratio of the air breakdown voltage to the air gap decreases with increasing gap. At a gap of approximately 10 μm, the breakdown field is 30 to 40 V/μm. For a gap of 1 cm, the breakdown field is approximately 3 V/μm. Since the electrostatic force acting on a charged particle is proportional to the applied electric field, a high electrostatic force that is not limited by air breakdown can be obtained when the air gap under laboratory conditions is approximately 10 μm or less. In the air gap range of 20 to 35 μm, electric fields in the range of 10 to 20 V/μm can be obtained without air breakdown. Since the air gap between the ring electrodes 18 and donor roll 12 is in the range of 20 to 35 μm, high powder detachment electric fields of approximately 15 V/μm can be obtained with print ring voltages in the range of 300 V.

For larger air gaps of approximately 500 µm, which is characteristic of the spacing between the aperture array 22 and conductive roll 26 behind the print medium 16, the air breakdown limitation for the electric field is about 4 V/µm. This implies that the maximum air breakdown voltage for the power supply 28 illustrated in FIG. 2 is about 2 kV. To provide an operation margin to prevent the possibility of air breakdown, typical applied voltages provided by the power supply 28 are approximately 1.5 kV. The polarity of the applied voltage is opposite of that of the polarity of the charged powder 14 to provide an attractive force towards the print medium 16.

To modulate the deposition of charged powder 14 on the print medium 16, the voltage on the print ring electrode 18 around each aperture 24 is switched on and off. If it is assumed for illustration purposes that the powder 14 is charged negatively by the powder charging subsystem 10, a voltage of about +300 V applied to a print ring electrode 24 will create a high electric field and consequently an electrostatic force for the detachment of negatively charged powder 14 from the donor roll 12. When the negatively charged powder 14 is injected into the space between the aperture array 22 and print medium 16, the electric field in that space provides an electrostatic force for the transport and deposition of the charged powder on the print medium 16. By controlling the pulse width of the deposition voltage applied to the print ring electrode 18, the amount of powder deposited in a dot 15 on the print can be controlled to provide grey levels of powder deposition. For no dot printing, the voltage on the print ring electrode 18 is usually set at a low value such as −50 V to electrostatically prevent negatively charged powder from passing through the aperture 24.

If one attempts to build a 3D object with triboelectric charged, non-conductive powder utilizing a direct deposition printer 2 as illustrated in FIGS. 1-5, problems are encountered because the thickness (and therefore the size) of the object that can be built is limited. More specifically, the thickness of the object is self-limited because of two problems. In the operation of the direct charged powder deposition printer 2, the electrostatic force for transporting charged powder 14 across the air gap between the aperture array 22 and print medium 16 (or in this application, the build object, not shown, as a substitute for the print medium 16) is provided by an electric field due to an electrical bias applied to the conducting substrate 26 of the build object. As the thickness of the non-conductive 3D build object increases due to multiple layers of powder deposition, the distance between the object conductive substrate 26 and the aperture array 22 must be increased to maintain an air gap between the top of the 3D object and aperture array 22. To maintain a deposition electric field of approximately 4 V/µm, the voltage on the conductive substrate electrode that is provided by the power supply 28 must also be increased to compensate for the electric field reduction due to the increased thickness. For a 3D non-conductive object that is approximately 1 or 5 cm thick, it is estimated that the power supply voltage 28 would need to be increased to 4 or 20 kV, respectively. Such high voltages are impractical.

The other problem that limits the build thickness of the 3D object is the accumulation of charge on the object due to charge on the deposited powder that creates a secondary electric field, which suppresses further powder deposition. Furthermore, the Applicant's believe that any irregularities in this charge accumulation may also cause irregularities in the uniformity of the charged powder deposition on the build object.

Figure 9:
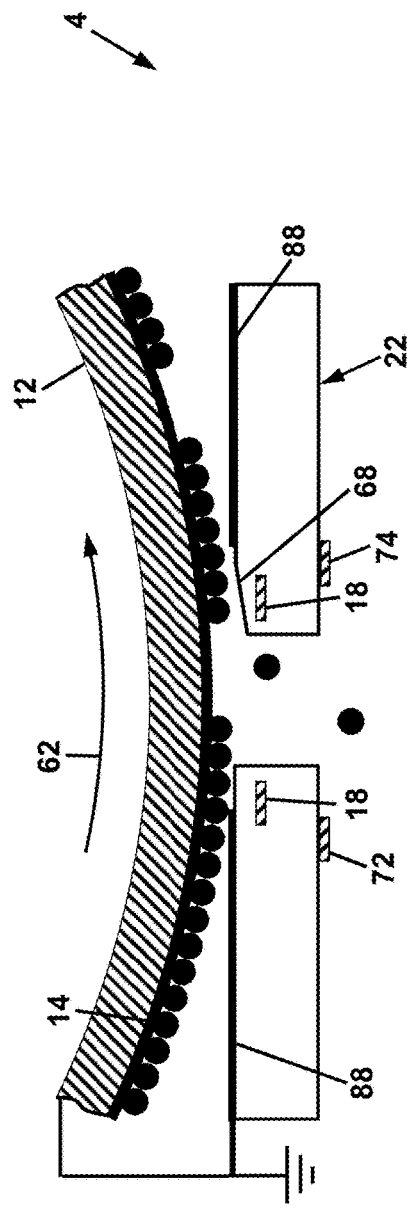
FIG. 9 is a schematic illustration of an aperture array with print ring electrodes and deflection electrodes to control the direct deposition of triboelectric charged, non-conductive powder onto a 3D object and support that is rendered conducting.
Figure 9:
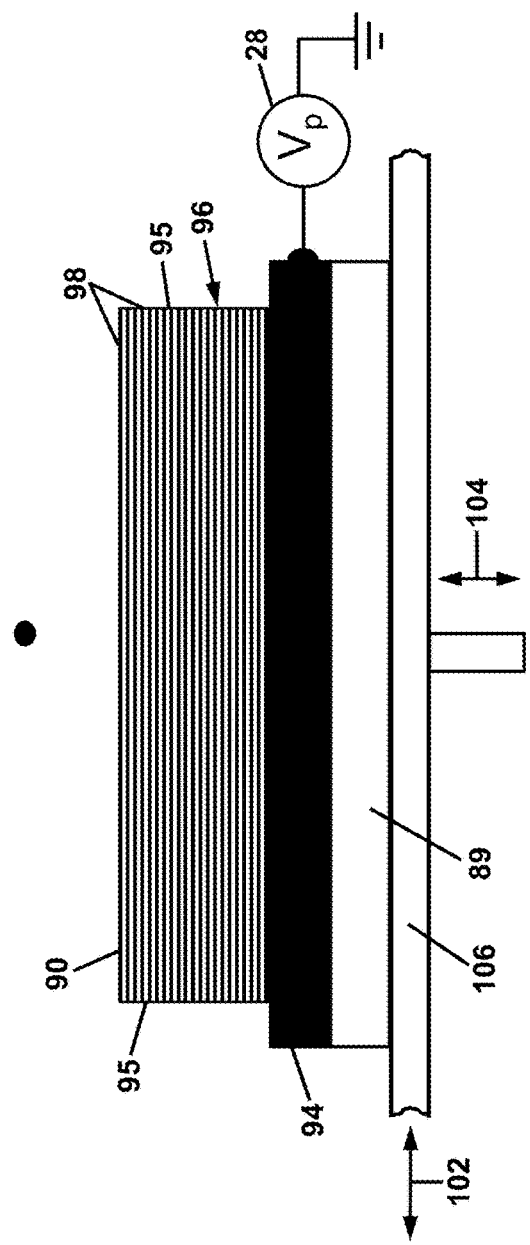

To enable building a 3D object with triboelectric charged, non-conductive powder utilizing direct deposition printing technology, it is the purpose of this disclosure to describe a new process, apparatus, and materials whereby the 3D object and support structure are rendered sufficiently conducting either temporarily or permanently so that an electrical bias supplied to the conductive substrate of the 3D object and support material is also applied to the surface of the 3D object and support material. FIG. 9 illustrates an apparatus 4 of the present disclosure for building a 3D object 96. In the operation of the apparatus 4 to build the 3D object 96, the top 90 and sides 95 of the 3D object 96 as well as the conductive substrate 94 are periodically rendered sufficiently conducting such that surfaces 98 of the 3D object are maintained at the same electrical potential as that of the applied voltage from power supply 28.

Under these circumstances, the electric field within the air gap between aperture array 22 and object 96 is independent of the thickness of the 3D object 96 with support material. The conductive substrate 94 for the 3D object and support material is flat and electrically insulated by a platform 89 attached to a moving carriage 106 that can be translated back and forth in the process direction 102, as well as the vertical direction 104 through the use of motors and drive apparatus. A voltage from power supply 28 is connected to conductive substrate 94. As the 3D object 96 becomes thicker by repeated depositions of charged powder 14 as the platform 106 moves back and forth, the vertical position of the platform 106 is adjusted to maintain a desired spacing between the top 90 of the 3D object 96 and the aperture array 22.

In practicing the 3D object fabrication methods and using the 3D object fabrication apparatus of the present disclosure, the problem of rendering the 3D object and support material sufficiently conducting for efficient electrostatic transfer of the powder to the 3D object is solved using a separate post-deposition step. If multiple powder layers are first deposited before applying a temporary or permanent conductive material, each deposited layer of charged powder may first be neutralized i.e., electrically discharged, with a separate post-deposition step utilizing an AC corona gaseous ion station. Other post-deposition steps may also include methods for providing heat and/or pressure for consolidating or fusing the powder layer to the 3D object and support layer, as well as a station for maintaining a smooth surface. Since non-conductive powder is used to build the 3D object and support, the conversion of the 3D part/support to conductive material can be either temporary or permanent. If it is desired that the 3D object be electrically non-conductive upon the completion of the additive manufacturing, then a temporary or transient conductivity can be imparted to the 3D object during the build process.

It should be noted that any one post-deposition station for conditioning the 3D object and support material does not necessarily need to be utilized after each electrostatically deposited powder layer. Rather, a number of powder layers can be electrostatically deposited on the 3D object and support material before there is any need to condition such multiple layers. For example, a temporary or permanent conductive material might be applied only after multiple layers are deposited on the 3D object and support material. However, when multiple layers are first electrostatically deposited before applying a temporary or permanent conductive material, it would be beneficial to neutralize each deposited layer of charged powder with an AC corona gaseous ion station that reduces the repulsive electric field from the transferred powder charge. The neutralization of a deposited powder layer prevents a reduction in the electric field for electrostatically depositing the next charged powder layer.

Another example of a conditioning step that does not necessarily need to be carried out after each electrostatically deposited powder layer is the application of heat and/or pressure for consolidating or fusing the powder. In certain embodiments, such optional fusing after depositing multiple powder layers can enable higher 3D object build rates.

Certain embodiments of the apparatus and methods of the present disclosure for the fabrication of a 3D object will now be described in further detail, with reference in particular to FIGS. 10-12. For multiple-powder direct deposition systems, direct deposition systems in tandem are advantageous for producing a 3D object with multiple colored and functional powders. For certain 3D objects that require highly precise dimensions and/or specific color patterns and/or color appearances, the multiple powder depositions must be assembled in registration on the 3D object.

Figure 10:
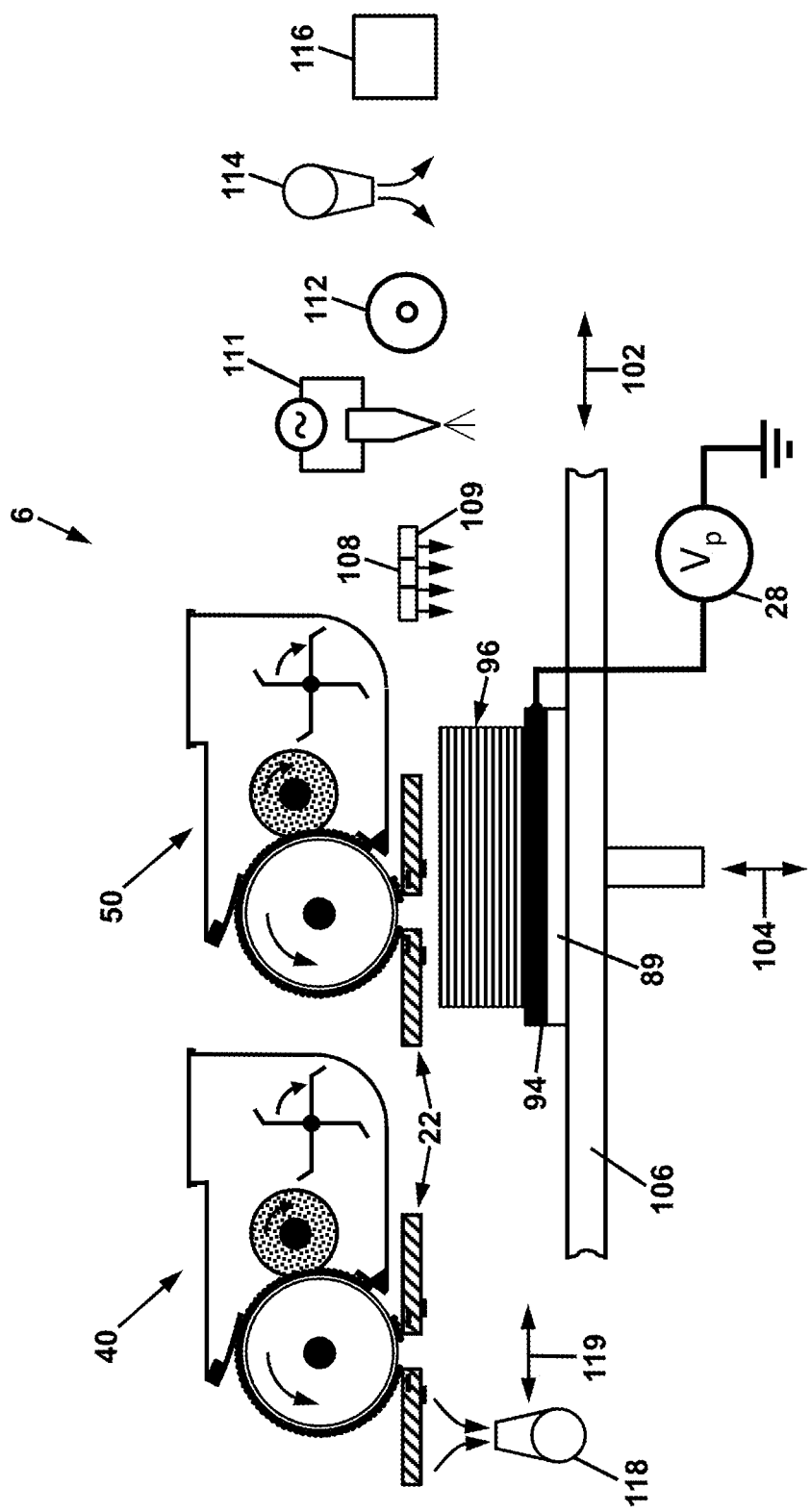
FIG. 10 is a schematic illustration of two direct powder deposition stations in tandem that enable electrostatic deposition of triboelectric charged, non-conductive powder onto a 3D object and support material rendered conductive and conditioned by post-deposition stations.

FIG. 10 illustrates an alternative apparatus 6 of the present disclosure for building a 3D object 96. The apparatus 6 is comprised of two direct powder deposition stations 40 and 50, each of which include subsystems with means for generating a charged powder source and controlling the powder deposition with an aperture array. The 3D object 96 is built on a conductive substrate 94 that is electrically isolated by an insulating platform 89 attached to a moving carriage 106, which can be translated back and forth in the process direction 102, as well as the vertical direction 104 through the use of motors and drive apparatus (not shown). A voltage from power supply 28 is connected to conductive substrate 94. When multiple layers are first deposited before applying temporary or permanent conductive material contained in a vessel 108 associated with a post-deposition station 109, each transferred layer of charged powder may first be neutralized with an AC corona gaseous ion station 111. FIG. 10 also illustrates the possibility of post-deposition consolidation or fusing of the powder layer(s) on the object 96 by station 112. The station 112 may include a fusing roll for the application of heat and pressure to the powder layer(s), as well as a non-contact heating device such as an infrared heater. The post-deposition consolidation or fusing of powder layer(s) on object 96 by station 112 can also be assisted by heating the object conductive substrate 94 to maintain the temperature of the object near the softening point of the powder material. As used herein, the term "softening point" with respect to temperature is meant to indicate the temperature at which the unfused powder in the layer deposited on the object undergoes creeping flow and begins to sinter into a continuous layer.

Other post-deposition stations can include a cooling device 114, and a surface-smoothing device 116. One example of a surface smoothing device 116 is a heated bar or roller (not shown) with a low surface energy coating. A pre-deposition station 118 is also illustrated in FIG. 10 for the purpose of cleaning any undesired powder accumulation from around each aperture. The pre-deposition station 118 may comprise a combination rotating brush and vacuum system that may be periodically translated back and forth in the direction of bidirectional arrow 119 under the aperture arrays 22 of each direct powder deposition station. The pre-deposition station 118 may also be used to maintain the aperture array temperature near ambient temperature through a combination of air cooling and thermal conductance.

The conductive material in a liquid vessel 108 of station 109 is deposited on the top and sides of the 3D object 96 as well as the conductive substrate 94 that can be translated back and forth in the direction of bidirectional arrow 102. A voltage provided by a power supply 28 is applied to the conductive substrate 94 to provide the electric field for direct deposition of charged powder 14 onto the 3D object 96 rendered conducting by the conductive material.

In other embodiments, the deposited layers may be processes as stacks of layers, as disclosed in the aforementioned U.S. Provisional Patent Application No. 62/440,487.

It is useful to provide a detailed description of the materials and methods for rendering a 3D object and its support material conductive to enable the direct deposition of triboelectric charged, non-conductive powder onto the 3D object and support material. Examples of temporary conductive agents include various liquids such as alcohols or water with surfactants. In applying such liquids to a powder layer on the surface of the 3D object and support material, the Applicants hypothesize that the liquid must have sufficient electrical conductivity and sufficiently low surface energy so that the liquid can wet the powder layer by capillary forces. (It is noted that in embodiments in which the conductive agent material is a liquid, it is preferable to apply the liquid conductive agent to the powder layer prior to fusing the powder layer, so that the liquid is imbibed into the powder.) In further analyzing the possibility of using a liquid as a conductive agent, the Applicants further hypothesize that the electrical conductivity of the liquid used to render the surface of a 3D object and support material sufficiently conducting temporarily should be on the order of or greater than $4 \times 10^{-2}$ Siemens per meter (S/m).

Before considering the types of fluids that have sufficient conductivity to render the surface of a non-conductive material temporarily conducting to enable electrostatic transfer of charged powder, it is further noted that the liquid preferably is able to wet the powder and therefore be imbibed within the void spaces of the powder through the action of capillary forces. The wettability of a powder layer by a liquid depends on a number of factors including the relative surface energies of the powder and liquid. For example, the wettability of a particular powder can be improved with a surface additive. Furthermore, the wettability can be improved through the addition of surfactants in the liquid. In certain embodiments, polar protic solvents, such as water and low molecular weight alcohol, are considered to be suitable liquids.

Water represents one class of liquids that can provide sufficient electrical conductivity and powder wettability through the inclusion of additives. The electrical conductivity of water is highly dependent on the ion concentration of salt additives. For pure water at room temperature, the electrical conductivity of about 5 µS/m is inadequate for rendering the surface of a 3D object and support material conducting. The presence of an electrolyte is beneficial in increasing the conductivity. For example, drinking (tap) water, containing small concentrations of various dissolved salts, typically has a conductivity of 0.05 S/m, which meets the conductivity requirement. The addition of salt at concentrations comparable to that of sea water increases the electrical conductivity to about 5 S/m; a conductivity much greater than the requirement.

Although a salt solution of water can provide sufficient electrical conductivity, the surface energy of water at 73 mN/m (milli-newton per meter) precludes the wettability of typical powder materials. However, the wettability of powders can be obtained through the addition of surfactants that effectively lower the surface energy of water.

Alcohols represent another class of liquids that can have sufficient electrical conductivity to satisfy the conductivity requirement for rendering an insulative surface temporarily conducting to enable electrostatic transfer of charged powder. Possible suitable alcohols include methanol, ethanol, propanol and isopropanol.

The use of liquids to render the surface of a 3D object conducting to enable electrostatic transfer of powder layers provides a certain degree of powder cohesion due to capillary forces. However, the cohesion due to the capillary force vanishes if the liquid evaporates, as will particularly be the case when using alcohol versus water based liquids. To provide permanent cohesion of the 3D object and support material, various polymeric materials may be added to the liquid for binding the powder together after the liquid evaporates. For water-based liquids, water-soluble polymers such as polyvinyl acetate may be added to provide a powder binding agent after the water evaporates. This polymer is widely used in wood glues. For alcohol-based liquids, various polymeric materials such as the copolymer polyvinylpyrrolidone and polyvinyl acetate may be used to provide cohesion after the alcohol evaporates. Other examples of polymeric binder materials include acrylates, polydimethylsiloxane, shellac, and gum Arabic.

As another approach for binding powder layers after deposition, the conductive liquid can contain photopolymers for inducing cross-linking upon exposure to a UV light source. It is preferable that the photopolymers have a low shrinkage upon polymerization in order to avoid distortion of the 3D object. Common monomers include multifunctional acrylates in combination with a non-polymeric component. Other polymers include epoxide resins with cationic photoinitiators as well as free-radical and cationic polymerizations comprised of both epoxide and acrylate monomers.

Another method for binding powder layers after deposition is to utilize either a solvent or heat to render the powder or its coating tacky. In the case of solvent exposure, the solvent can be applied via either the conductive fluid or by a separate applicator. If heat is utilized, both heat and pressure can be applied to the deposited layer by post-deposition fusing 112 followed by a cooling step 114 as illustrated in FIG. 10.

FIG. 10 also illustrates the deposition of multiple charged powder layers onto a translating 3D object 96 rendered conductive by a post-deposition station 109. The post transfer station 109 may include a liquid vessel 108 containing a liquid conductive material. For the application of conductive liquids such as alcohols or water with surfactants, a variety of non-contact liquid applicators can be used. Examples of such applicators include 1) humidifiers that typically use ultrasonic transducers to generate liquid droplets, 2) airless spray nozzles that use hydraulic pressure to atomize and spray liquids, 3) ultrasonic nozzles that use piezoelectric transducers in the nozzle tip to generate waves in a liquid film that causes droplets to break off at the surface and 4) various technologies associated with full-width inkjet print heads. Inkjet printing technologies can be broadly classified as being Drop-on-Demand (DOD) or Continuous Ink Jet (CIJ). The DOD technologies are based on the utilization of either thermal or piezoelectric jetting forces. The thermal method that uses a heating element has been widely utilized in the printing industry for aqueous based inks. For non-aqueous ink formulations, piezoelectric transducers enable printing with a wider variety of ink types. For CIJ printing, a continuous stream of droplets is generated by pressure and a piezoelectric transducer. The droplets are charged at the nozzle and deflected by a voltage applied to an electrode to enable droplet deposition on a substrate. The undeflected droplets are caught in a gutter and returned to an ink supply tank.

The utilization of full-width array inkjet printing technologies is well suited for the non-contact application of conductive liquids to the surface of a 3D object and support material. Such technologies can provide a well-controlled amount of liquid deposition on a surface. Both the DOD and CIJ technologies are capable of printing process speeds up to 1000 ft/min.

Although inkjet printing technologies seem to be well-suited for rendering the surface of a 3D object and support material conducting with a conductive liquid, the requirements for the resolution of the deposition can be relaxed. In printing, resolutions up to 600 droplets per inch are often required for high print quality. This requires droplets are the order of 30 μm in diameter. In utilizing inkjet printing technologies to apply a controlled amount of conductive liquid to a 3D object and support material, a larger drop size and lower deposition resolution is sufficient since a uniform deposition over extended areas is typically required. Capillary forces acting on a liquid deposited on a powder surface will cause the liquid to become smoother through liquid spreading.

Figure 11:
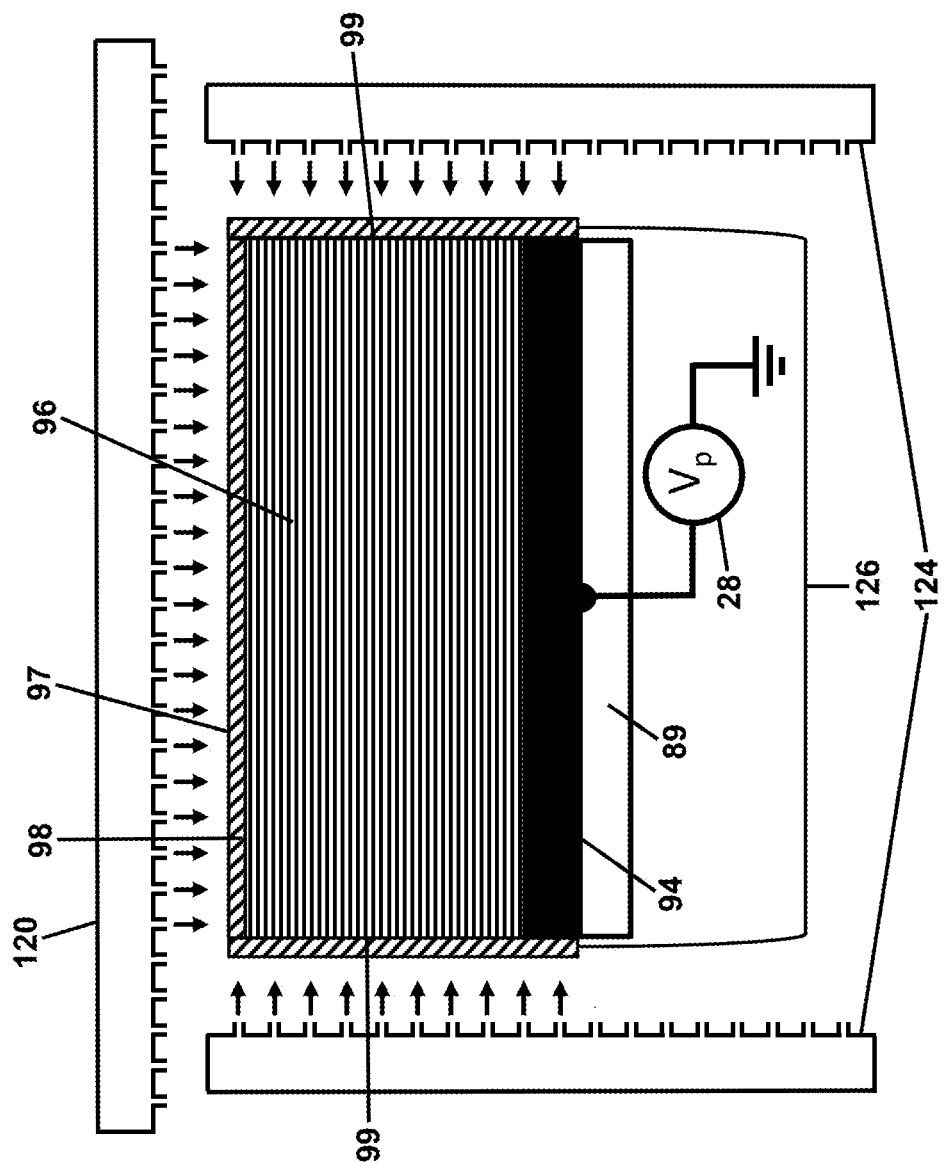
FIG. 11 illustrates a cross-sectional view in the cross-process direction that shows horizontal and vertical applicators for applying conductive liquid to the top and sides of a 3D object and support material fabricated in accordance with the present disclosure.

FIG. 11 illustrates a conductive layer 97 that has been deposited onto the top surface 98 of a 3D object and support material 96 by a conductive liquid applicator 120. Controlled deposition of the conductive liquid on top of the 3D object and support material can be obtained with one of a number of horizontal oriented applicators based on inkjet printing technologies. Even though an applicator extends beyond the width of the 3D object and support material, the inkjet technologies enable application of the conductive liquid only in desired areas of the 3D object and support material. This is illustrated in FIG. 11 that is a view of the 3D object in the cross-process direction. The horizontal liquid applicator 120 is shown to deposit conductive liquid 97 in only the area(s) 98 on top of the 3D object and support material 96. To provide electrical contact between the deposited conductive layer 97 and the conductive substrate 94, a pair of vertical liquid applicators 124 is shown to deposit conductive liquid 126 on the sides 99 of the 3D object 96 and support material in the process direction. As the build thickness of the 3D object and support material increases, more jets of the liquid applicator are energized to ensure coverage of the sides from the top of the 3D object 96 to the conductive substrate. The composition of the conductive liquid 126 for the sides 99 may differ from the conductive liquid 97 for the top 98 since, for example, the latter might contain binding agents.

Although single respective liquid applicators are illustrated in FIG. 11 for the top 98 and sides 99 of the 3D object 96, it is clear that more than one liquid applicator may be utilized if a greater amount of liquid deposition is desired. Also one might apply different liquids, which contain binder for application to object areas and which contain no binder for application to support material areas. The implication from FIG. 11 and this accompanying disclosure is that conductive liquid may be applied to the top 98 and sides 99 of the 3D object 96 after each charged powder deposition to the 3D object 96. Depending on the liquid evaporation rates and the amount of liquid applied by the applicator 109, it may be sufficient to apply the conductive liquid after a sequence of deposited powder layers, rather than applying it to each powder layer.

In apparatus embodiments alternative to those comprising horizontal and vertical ink jet applicators as depicted in FIG. 11, other applicators for applying conductive materials are contemplated. In certain embodiments, a liquid atomization or other dispensing applicator may be used, which is capable of applying conductive liquid as a top layer 97 on the top 98 of the object 96 and as a side layer 126 on the side walls 99 of the object 96. In other embodiments, solid conductive materials as disclosed herein may be applied as top and side layers 97 and 126, respectively, using an applicator brush or other suitable means.

Rather than applying a temporary or transient conductive liquid to a 3D object and support material to render it conducting for efficient electric field transfer of charged powder layers, a permanent conductive material in the form of a powder or film of a solid may alternatively be used if it is desired or acceptable that the 3D object is electrically charge-relaxable or conducting upon completion of the manufacturing process. The permanent conductive material may be applied to the 3D object 96 after one or more depositions of powder layers. In certain embodiments in which the conductive agent material is a solid, the solid conductive agent material is preferably applied after fusing the powder layer, so that a relatively smooth and shear-resistant surface is provided for receiving the solid conductive agent material. Application methods may include the use of a roller, brush, magnetic brush, wiper blade and sublimation. In such embodiments, the post-transfer station 109 may include a solids holding vessel 108 (FIG. 10) containing the solid conductive material.

Examples of permanent conductive agents that can be applied include fine conductive particles such as conductive polymers, carbon black, graphite, graphene, graphene nano-platelets, carbon nanowires, or carbon nanotubes, fluorine-doped tin oxide and sublimable materials such as indium tin oxide, etc. The effectiveness of fine particles or sublimable materials in being able to render a surface conductive is enhanced when the deposition is made onto a smooth surface such as that produced by subjecting powder layers to a sintering or fusing station. The permanent conductive agent can be applied directly to either the upper surface 98 of the 3D object and support material 96 or the surface of the heated fuser roll as part of the sintering or fusing station. When the permanent conductive agent is applied to the fuser roll, the conditions are such that permanent conductive agent transfers to the upper surface 98 of the 3D object and support material 96.

One such "dry" or solid phase conductive material that is well suited in this application is graphite. This material may be applied to the surface of the 3D object 96 by various means to render the surface conductive. The Applicants have discovered that it is particularly beneficial to apply the conductive layer such as graphite as a very thin layer. In certain embodiments, the layer may be applied at a thickness of 0.75 µm thick, which is much thinner than the average particle diameter of the powder being used, which may be, e.g., acrylonitrile butadiene styrene (ABS) powder. The Applicants believe that in using a sufficiently thin conductive layer, this enables the average ABS particle to penetrate through the graphite layer and contact the previously fused powder layer underneath, thereby enabling, optionally under heat and pressure, interpenetration of the ABS molecules to form a continuous solid structure.

Despite the low physical thickness of the graphite layer, its surface resistivity is low enough to make the ABS surface sufficiently conducting. It has been discovered that application of a graphite layer to achieve sheet resistance of $10^3$-$10^5$ ohms/square produces superior results. By neutralizing powder charge build-up with an AC corona after each transfer, seven layers of powder have been successfully electrostatically deposited upon one another sequentially before fusing the entire stack and re-applying the conductive graphite layer. With seven or more layers of powder thickness per graphite/conductive agent application, the thickness ratio of powder to graphite approaches about 100:1, greatly reducing any impact of the agent on the mechanical integrity of the finished part. The Applicants have also discovered that the degree of surface conductivity imparted can be controlled by the amount of graphite applied and the pressure used in its application. Thus, one could systematically alter the conductivity throughout the build, if required, to achieve the appropriate conductivity for the process/materials used; the sheet resistance range may be from $10^1$ to $10^7$ ohms/square.

The use of direct powder deposition stations for fabricating 3D objects enables the formation of selectively colored objects on demand. This capability for producing selectively colored 3D objects has been discussed in a publication on "An Investigation of Selective Coloring with 3-D Laser Printing" by D. Cormier, J. Taylor and H. West in the J. Manufacturing Processes, Vol. 4/No. 2, (2002), pp. 148-152. It was found that the luminescence of a color decreases with increasing number of powder layers. But if a color powder layer is deposited on multiple layers of a white powder, the luminescence remains high. FIG. 12 illustrates an example of one layer of a 3D object in which the sides of a square cross-section of a 3D object have the color of red 128, yellow 132, green 134 and blue 136 surrounded by a support powder layer 138. A white powder 142 is deposited inside and adjacent to the colored powder to provide high luminescence when the surrounding support material 138 is removed. The core of the object can be formed from either white powder or other object powder 144 as illustrated in FIG. 12. To produce 3D objects with a full-color surface and an underlayer of white powder, a total of seven direct powder deposition stations is required for depositing powders of cyan, magenta, yellow, black, white, support and object.

The non-conductive powder used in direct charged powder deposition systems can be triboelectrically charged in a mono-component system illustrated as 10 in FIG. 1 or a hybrid system in which a two-component (mixture of powder with larger magnetic carrier beads) magnetic brush system is used to load and maintain a triboelectric charged, non-conductive powder layer on a donor roll. One preferred two-component magnetic brush system utilizes a mixture of the deposition powder and permanently magnetized carrier beads as disclosed in U.S. Pat. No. 4,546,060, the disclosure of which is incorporated herein by reference. Mono-component systems are typically used in home or small office electrophotographic printers due to their relatively small size. For office and production printers, a hybrid two-component magnetic brush system enables high-speed printing.

The magnetic carrier beads used in two-component magnetic brush systems may be either insulating, semiconducting or conducting. Polymeric coatings may be applied to the core bead material to control the triboelectric charging properties of the coated beads when mixed with insulative powder. Examples of core bead materials include gamma ferric oxide, barium ferrite and strontium ferrite. In certain embodiments, the average diameter of the magnetic beads may be in the range of 10 to 200 micrometers (µm). In certain embodiments, the mixture of powder and magnetic carrier beads is comprised of at least about 60 weight percent of magnetic bead particles.

The powder used in direct electrostatic printing systems typically is comprised of a thermoplastic such as copolymers of polystyrene, and polymethylmethacrylate, polyvinyl acetate, polyurethane, etc. Such polymers tend to be brittle and therefore not sufficiently tough to withstand engineering applications of 3D objects. Consequently, most applications for building polymeric 3D objects require the use of engineering polymers such as an acrylonitrile-butadiene-styrene (ABS) copolymer. Other engineering polymers include polycarbonate, blends of polycarbonate and acrylonitrile-butadiene-styrene, polyamides, polyphenylsulfone, polyetherimide, etc. Such polymers are compatible with the direct electrostatic deposition process in that the powder is insulating to facilitate triboelectric charging of the powder and enable the use of an electrostatic force to transfer the charged powder from one surface to another. Metallic powders can also be used provided that the surface of the conductive powder is coated with an insulative material such as an oxide layer and/or a polymeric material. Although the powder used in a mono-component and two-component deposition systems mixture is typically non-conductive, it can also be charge relaxable such that the powder tends to be insulating during the process of triboelectric charging and deposition of powder onto a substrate, but upon sufficient dwell time on the substrate and/or subjecting the powder to an ambient such as moisture, the charge on the deposited powder relaxes (dissipates). Examples of insulative and charge relaxable powders include various polymeric materials, mixtures of such materials with pigments or dyes, ceramic powders, polymeric coatings on metallic and ceramic powders, etc. Blends of such powders may also be used in direct powder deposition stations such as 40 and 50 in FIG. 10.

Non-conductive powder that is triboelectric charged may include various additives such carbon black, titanium dioxide or colored dyes or pigments, internal triboelectric charge control additives, and surface flow agent such as fumed silica, metal stearates, fluoropolymer powder, etc. Although the properties of the powders used to build the 3D object are selected to provide the desired appearance and mechanical properties of the 3D object, the powder used for support during the layer-by-layer build process is viewed to be sacrificial and easily removable upon completion of the 3D object building. Examples of such powder materials include water dissolvable polymers and high melting point organic or inorganic materials that do not sinter when subjected to temperatures that sinter the 3D object powder.

When heat and/or pressure after each powder layer deposition is used to consolidate or fuse the powders for the 3D object and support layer, the consolidation or fusing properties of the powders will dictate the type of 3D object and support that is formed. If there is complete melting of either or both of the 3D object and support powders, a solid material will be formed. On the other hand, the consolidation conditions and powder properties can be such that either or both of the 3D object and support powders are sintered. After the support material is removed, a solid 3D object can be formed by a separate infusion step with a lower melting material.

This demonstrates the utility disclosed herein in applying a temporary (or permanent) conductive material to the surface and sides of a 3D object to enable the repeated deposition of triboelectric charged, non-conductive powder to build the 3D object, independent of its thickness.

It is, therefore, apparent that there has been provided, in accordance with the present invention, a method and apparatus for fabricating three-dimensional objects by direct charged powder deposition. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. An apparatus for fabricating an object, the apparatus comprising:
    a) a platform movable in a conveyance direction and comprised of a top surface;
    b) a first powder aperture array disposed proximate to the top surface of the platform and comprising a panel having an inner surface and an outer surface, and a first plurality of powder dispensing apertures, the powder dispensing apertures comprised of:
        an orifice extending through the panel from the inner surface to the outer surface;
        a ring electrode disposed in the panel proximate to the inner surface and surrounding the orifice, and electrically connected to a ring electrode voltage source;
        a first deflection control electrode disposed on the outer surface of the panel and proximate to a first sector of a perimeter of the orifice at the outer surface of the panel; and
        a second deflection control electrode disposed on the outer surface of the panel and proximate to a second sector of a perimeter of the orifice at the outer surface of the panel, wherein the second sector of the perimeter of the orifice is proximate and opposed to the first sector of the perimeter of the orifice.

2. The apparatus of claim 1, further comprising a conductive material dispenser comprised of an applicator of conductive material connected to a material holding vessel.

3. The apparatus of claim 2, wherein the conductive material dispenser is comprised of a first applicator of conductive material disposed above the platform and operable to direct conductive material vertically toward the platform.

4. The apparatus of claim 3 wherein the conductive material dispenser is further comprised of a second applicator of conductive material disposed laterally with respect to the platform and operable to direct conductive material horizontally toward the platform.

5. The apparatus of claim 1, wherein the powder dispensing apertures of the first powder aperture array are arrayed along a first axis perpendicular to the conveyance direction of the platform.

6. The apparatus of claim 1, wherein the first deflection control electrode is electrically connected to a first powder deflection voltage source and the second deflection control electrode is electrically connected to a second powder deflection voltage source.

7. The apparatus of claim 6, wherein the first powder deflection voltage source is operable to repeatedly cycle between a first minimum voltage, a first intermediate voltage, and a first maximum voltage, and the second powder deflection voltage source is operable to repeatedly cycle between a second minimum voltage, a second intermediate voltage, and a second maximum voltage.

8. The apparatus of claim 7, wherein the first and second powder deflection voltage sources are operable such that when the first powder deflection voltage source is at the first minimum voltage, the second powder deflection voltage source is at the second maximum voltage; and when the first powder deflection voltage source is at the first intermediate voltage, the second powder deflection voltage source is at the second intermediate voltage; and when the first powder deflection voltage source is at the first maximum voltage, the second powder deflection voltage source is at the second minimum voltage.

9. The apparatus of claim 6, wherein the first sector of the perimeter of the orifice is proximate and intermediate between a first axis opposite the conveyance direction and a first axis perpendicular to the conveyance direction, and the second sector of the perimeter of the orifice is proximate and intermediate between a second axis opposite the conveyance direction and a second axis perpendicular to the conveyance direction.

10. The apparatus of claim 7, wherein the first minimum voltage is equal to the second minimum voltage, the first intermediate voltage is equal to the second intermediate voltage, and the first maximum voltage is equal to the second maximum voltage.

11. The apparatus of claim 10, wherein:
a) the platform is further comprised of a support substrate electrode;
b) the first and second powder deflection voltage sources are cyclable between minimum and maximum voltages at a frequency of v cycles per second;
c) the platform is operable to move the support substrate electrode relative to the powder aperture array in the conveyance direction at a velocity v such that a first set of powder dots is deposited when the first powder deflection voltage source is at the first minimum voltage and the second powder deflection voltage source is at the second maximum voltage is such that the powder is deflected in a proximate direction that is both opposing and perpendicular to the conveyance direction; and
d) the support substrate electrode moves a distance $d=v/3v$ before deposition of a second set of powder dots when the first and second powder deflection voltage sources are at the first intermediate voltage.

12. The apparatus of claim 11, wherein the platform is operable to move the support substrate electrode relative to the first powder aperture array in the conveyance direction such that the first and second sets of powder dots move an additional distance $d=v/3v$ at a time of deposition of a third set of powder dots when the first powder deflection voltage source is at the first maximum voltage, and the second powder deflection voltage source is at the second minimum voltage.

13. The apparatus of claim 11, further comprising a second powder aperture array comprising a second plurality of powder dispensing apertures arrayed along a second axis perpendicular to the conveyance direction of the platform, wherein the second plurality of powder dispensing apertures are offset from the first plurality of powder dispensing apertures along the second axis perpendicular to the conveyance direction.

14. The apparatus of claim 11, wherein the platform is further comprised of a support substrate electrode and the conductive material dispenser is operable to move in relative motion with respect to the platform and dispense electrically conductive material upon at least one of the conductive support substrate electrode and a surface of a powder layer of the object when the object is disposed on the support substrate electrode.

\* \* \* \* \*